(12) United States Patent
Cheung et al.

(10) Patent No.: US 9,277,222 B2
(45) Date of Patent: Mar. 1, 2016

(54) UNIFIED FRACTIONAL SEARCH AND MOTION COMPENSATION ARCHITECTURE ACROSS MULTIPLE VIDEO STANDARDS

(71) Applicant: QUALCOMM Incorporated, San Diego, CA (US)

(72) Inventors: Stephen Cheung, Markham, CA (US); Ling Feng Huang, San Diego, CA (US); Sumit Mohan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 464 days.

(21) Appl. No.: 13/852,213

(22) Filed: Mar. 28, 2013

(65) Prior Publication Data
US 2013/0301742 A1 Nov. 14, 2013

Related U.S. Application Data

(60) Provisional application No. 61/646,672, filed on May 14, 2012, provisional application No. 61/734,593, filed on Dec. 7, 2012.

(51) Int. Cl.
*H04N 7/26* (2006.01)
*H04N 7/36* (2006.01)
*H04N 7/01* (2006.01)
*H04N 19/80* (2014.01)
(Continued)

(52) U.S. Cl.
CPC ........... *H04N 19/0089* (2013.01); *H04N 19/43* (2014.11); *H04N 19/433* (2014.11); *H04N 19/439* (2014.11); *H04N 19/523* (2014.11); *H04N 19/59* (2014.11); *H04N 19/80* (2014.11)

(58) Field of Classification Search
CPC ............. H04N 7/36; H04N 7/01; H04N 7/12; H04N 7/15; H04N 7/26; G06T 7/20; G06K 9/32
See application file for complete search history.

(56) References Cited

U.S. PATENT DOCUMENTS 7,869,666 B2 1/2011 Ruggiero
8,107,571 B2 1/2012 Sullivan et al.
(Continued)

FOREIGN PATENT DOCUMENTS

GB 2456227 A 7/2009
WO WO 2007038357 A2 * 4/2007 ............... H04N 7/26

OTHER PUBLICATIONS

International Search Report and Written Opinion—PCT/US2013/040598—ISA/EPO—Aug. 21, 2013 (122686WO).
(Continued)

*Primary Examiner* — Sath V Perungavoor
*Assistant Examiner* — Patricia I Young
(74) *Attorney, Agent, or Firm* — Knobbe Martens Olson & Bear LLP

(57) ABSTRACT

Methods and systems for performing at least one of video encoding and video decoding are disclosed. In one implementation, the system includes a controller configured to determine a video standard associated with a portion of the video data, each portion of the video data associated with one of a plurality of video standards. The controller is further configured to provide a set of the filter parameters which are associated with a video standard to be used for at least one of the video encoding and decoding and at least one filter configured to filter at least one reference pixel received from the reference pixel memory based, at least in part, on the provided set of filter parameters.

31 Claims, 15 Drawing Sheets

(51) Int. Cl.
*H04N 19/433* (2014.01)
*H04N 19/523* (2014.01)
*H04N 19/43* (2014.01)
*H04N 19/59* (2014.01)
*H04N 19/42* (2014.01)

(56) References Cited

U.S. PATENT DOCUMENTS

| | | |
|---|---|---|
| 2006/0146935 A1 | 7/2006 | Winger |
| 2006/0291743 A1 | 12/2006 | Partiwala et al. |
| 2009/0168885 A1 | 7/2009 | Peng et al. |
| 2009/0257503 A1 | 10/2009 | Ye et al. |
| 2011/0080957 A1 | 4/2011 | Pan et al. |
| 2011/0310975 A1 | 12/2011 | Henry et al. |
| 2012/0087595 A1 | 4/2012 | Minezawa et al. |
| 2013/0177071 A1* | 7/2013 | Lu et al. .......... 375/240.03 |

OTHER PUBLICATIONS

Richter H., et al., "Generic algorithms for motion compensation and transformation," Proceedings of the Conference on Real-Time Image Processing 2008, San Jose, CA, USA, Jan. 28, 2008, 68110U, Jan. 28, 2008, pp. 1-12, XP55074031, SPIE—The International Society for Optical Engineering, USA DOI: 10.1117/12.766488., Retrieved from the Internet: http://proceedings.spiedigitallibrary.org/data/Conferences/Spiep/17429/68110U_1.pdf [retrieved on Aug. 2, 2013].

Zhou D., et al., "A Hardware-Efficient Dual-Standard VLSI Architecture for MC Interpolation in AVS and H.264," Circuits and Systems, 2007. ISCAS 2007, IEEE International Symposium 0 N, IEEE, PI, May 1, 2007, pp. 2910-2913, XP031181913, ISBN: 978-1-4244-0920-4.

* cited by examiner

UNIFIED FRACTIONAL SEARCH AND MOTION COMPENSATION ARCHITECTURE ACROSS MULTIPLE VIDEO STANDARDS

CROSS-REFERENCE TO RELATED APPLICATIONS

This application claims a priority benefit under 35 U.S.C. §119(e) from U.S. Provisional Patent Application No. 61/646,672, entitled "Unified Fractional Search and Motion Compensation Architecture Across Multiple Video Standards," filed May 14, 2012, and from U.S. Provisional Patent Application No. 61/734,593, entitled "Unified Fractional Search and Motion Compensation Architecture Across Multiple Video Standards," filed Dec. 7, 2012, which are all incorporated by reference in their entirety. Any and all priority claims identified in the Application Data Sheet, or any correction thereto, are hereby incorporated by reference under 37 C.F.R. §1.57.

BACKGROUND

1. Field

This disclosure relates to video coding, and in particular to handling different filtering and processing requirements for various video standards based on parameterized filters and processing architecture.

2. Background

Digital video coding is used in wide range of devices, including digital televisions, digital direct broadcast systems, wireless communication devices, personal digital assistants (PDAs), laptop or desktop computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently.

In general, video compression techniques perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

SUMMARY

The systems, methods and devices of the disclosure each have several innovative aspects, no single one of which is solely responsible for the desirable attributes disclosed herein.

In one innovative aspect, a system for processing video data is provided. The system includes a controller configured to determine a video standard associated with a portion of the video data, each portion of the video data associated with one of a plurality of video standards. The controller is also configured to provide a set of filter parameters for the portion of the video data based on the determined video standard. The system further includes at least one filter configured to filter at least one reference pixel included in the portion of the video data based, at least in part, on the provided set of filter parameters.

In another innovative aspect, a method of processing video data is provided. The method includes detecting a video standard associated with a portion of the video data, each portion of the video data associated with one of a plurality of video standards. The method also includes providing a set of filter parameters for the portion of the video data based on the detected video standard. The method further includes filtering at least one reference pixel of the portion of the video data based, at least in part, on the provided set of filter parameters.

In a further innovative aspect, a non-transitory computer readable medium storing a processor-readable code is provided. The processor-readable code is for programming one or more processors to perform a method of processing video data. The method includes detecting a video standard associated with a portion of the video data, each portion of the video data associated with one of a plurality of video standards. The method also includes providing a set of filter parameters for the portion of the video data based on the detected video standard. The method further includes filtering at least one reference pixel of the portion of the video data based, at least in part, on the provided set of filter parameters.

An additional innovative system for processing video data is provided. The system includes means for detecting a video standard associated with a portion of the video data, each portion of the video data associated with one of a plurality of video standards. The system also includes means for providing a set of filter parameters for the portion of the video data based on the detected video standard. The system includes means for filtering at least one reference pixel of the portion of the video data based, at least in part, on the provided set of filter parameters.

BRIEF DESCRIPTION OF DRAWINGS

The above mentioned and other features of this disclosure will now be described with reference to the drawings of several implementations of the present systems and methods for unified fractional search and motion compensation architecture. The illustrated implementations of the systems and methods are intended to illustrate, but not to limit the disclosure. The drawings contain the following figures.

DETAILED DESCRIPTION

Figure 1:
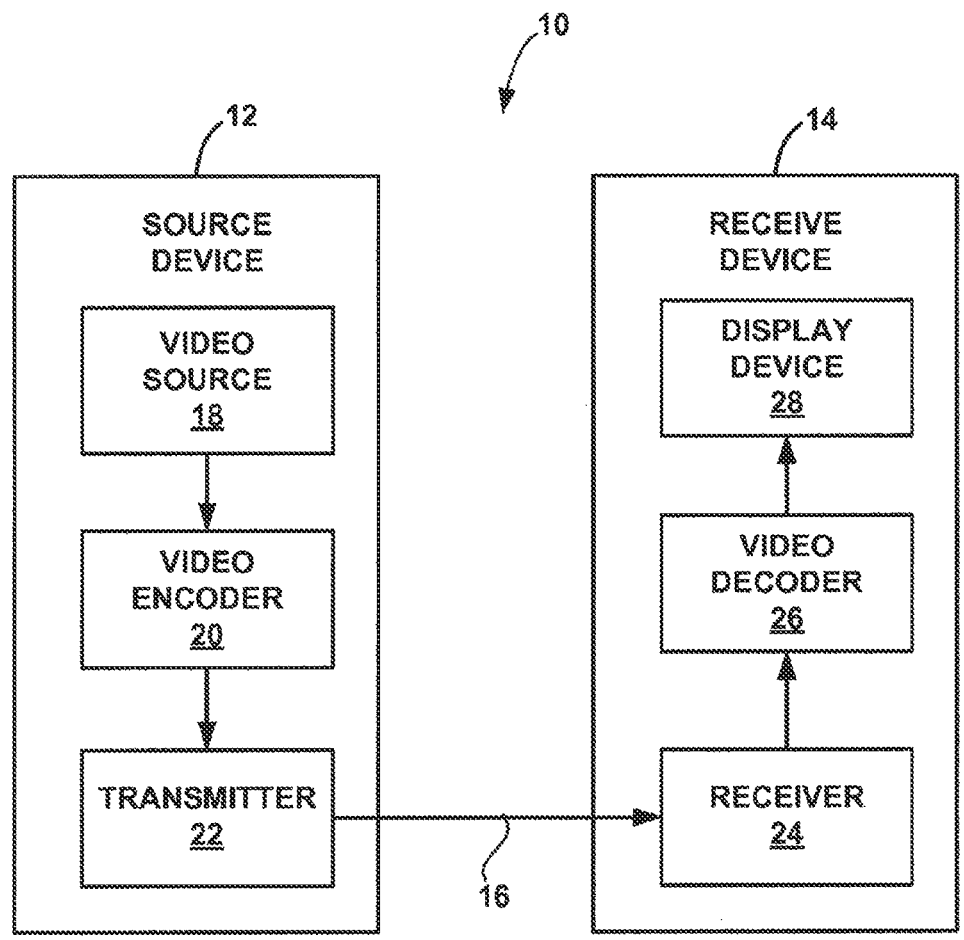
FIG. 1 is a block diagram illustrating a video encoding and decoding system.

The described systems and methods include parameterized filters and a configurable processing architecture to address the different filtering and processing requirements for various standards. The parameterized filters employ coefficients/parameters that are stored in an efficiently accessible location (e.g., RAM) and are fetched accordingly depending on the standard. One non-limiting advantage of such a configuration is the video processing may be accomplished using one set of filters across multiple standards.

In addition to dynamically configuring the filters, how the filters are pipelined to process the video data may also be dynamically configured. The processing pipeline may be divided into multiple stages which can be dynamically configured to execute multiple filters according to, for example, a video standard. In one implementation described below, a four stage pipeline is described. A pipeline divided into four stages may be configured by, for example parameters, so that several methods of processing video data can be handled. In one configuration, stage 1 may handle the horizontal or vertical filtering, stage 2 may handle the 2nd level filtering (can be horizontal or vertical), stage 3 may handle the 3rd level (or fractional (e.g., quarter) pixel) filtering, stage 4 may provide similar functionality to the stage 2 filter but as a compliment to the stage 3 filter. For example, a combination of the stage 3 filter and the stage 4 filter may provide horizontal and vertical filtering for high efficiency video coding. One non-limiting advantage of configurations such as these is the multi-standard processing pipeline is smaller in area. Reducing the area needed to implement the pipeline may result in a smaller, lighter, cheaper, and more energy efficient device than a device with a larger pipeline footprint. A further non-limiting advantage of the described pipeline is the flexibility to handle different horizontal/vertical filter orderings. This allows for an easy, dynamic extension of the same device to process video data according to other standards.

Implementations will be described with respect to the accompanying drawings. Like reference numerals refer to like elements throughout the detailed description.

In general, this disclosure is directed to techniques for video data coding. The term "coding," as used herein, may refer to encoding, decoding or both. Although the techniques described in this disclosure may be applicable to a wide variety of practical applications, the disclosure will refer to digital video encoding and decoding for purposes of example and illustration.

FIG. 1 is a block diagram illustrating a video encoding and decoding system. As shown in FIG. 1, system 10 includes a source device 12 that transmits encoded video to a receive device 14 via a communication channel 16. Source device 12 may include a video source 18, video encoder 20 and a transmitter 22. Receive device 14 may include a receiver 24, video decoder 26 and video display device 28. System 10 may be configured to apply techniques for efficient coding of digital video data in accordance with this disclosure.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. For other data compression and coding applications, devices 12, 14 could be configured to send and receive, or exchange, other types of data, such as image, speech or audio data, or combinations of two or more of video, image, speech and audio data. Accordingly, discussion of video encoding and decoding applications is provided for purposes of illustration and should not be considered limiting of the various aspects of the disclosure as broadly described herein.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. Hence, in some aspects, source device 12, receive device 14 or both may form a wireless communication device handset, such as a mobile telephone handset. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting diode (OLED) display.

Video encoder 20 and video decoder 26 may be configured to support scalable video coding (SVC) for spatial, temporal and/or signal-to-noise ratio (SNR) scalability. In some aspects, video encoder 20 and video decoder 26 may be configured to support fine granularity SNR scalability (FGS) coding for SVC. Encoder 20 and decoder 26 may support various degrees of scalability by supporting encoding, transmission and decoding of a base layer and one or more scalable enhancement layers. For scalable video coding, a base layer carries video data with a minimum level of quality. One or more enhancement layers carry additional bit stream to support higher spatial, temporal and/or SNR levels.

Video encoder 20 and video decoder 26 may operate in part according to techniques described herein and in part according to a video compression standard, such as MPEG-2, MPEG-4, ITU-T H.263, or ITU-T H.264/MPEG-4 Advanced Video Coding (AVC). For example, the techniques used herein may be used to augment or replace the respective techniques used in a video compressions standard as would be understood by one of skill in the art. Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). The H.264 standard is described in ITU-T Recommendation H.264, Advanced video coding for generic audiovisual services, by the ITU-T Study Group, and dated March 2005, which may be referred to herein as the H.264 standard or H.264 specification, or the H.264/AVC standard or specification.

In some aspects, for video broadcasting, the techniques described in this disclosure may be applied to Enhanced H.264 video coding for delivering real-time video services in terrestrial mobile multimedia multicast (TM3) systems, e.g., via a wireless video broadcast server or wireless communication device handset. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive device, each of which may be similar to receive device 14 of FIG. 1.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video encoder 20 and video decoder 26 may be implemented at least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. Each slice may be an independently decodable unit. After prediction, a transform may be performed on the 8×8 residual block or 4×4 residual block, and an additional transform may be applied to the DC coefficients of the 4×4 blocks for chroma components or luma component if the intra__16×16 prediction mode is used.

Video encoder 20 and/or video decoder 26 of system 10 of FIG. 1 may be configured to employ techniques for video coding as described in this disclosure. In particular, video encoder 20 and/or video decoder 26 may include an entropy encoder and entropy decoder, respectively, that apply at least some of such techniques to reduce memory utilization, processing overhead, processing complexity, bandwidth consumption, data storage space, and/or power consumption.

Figure 2:
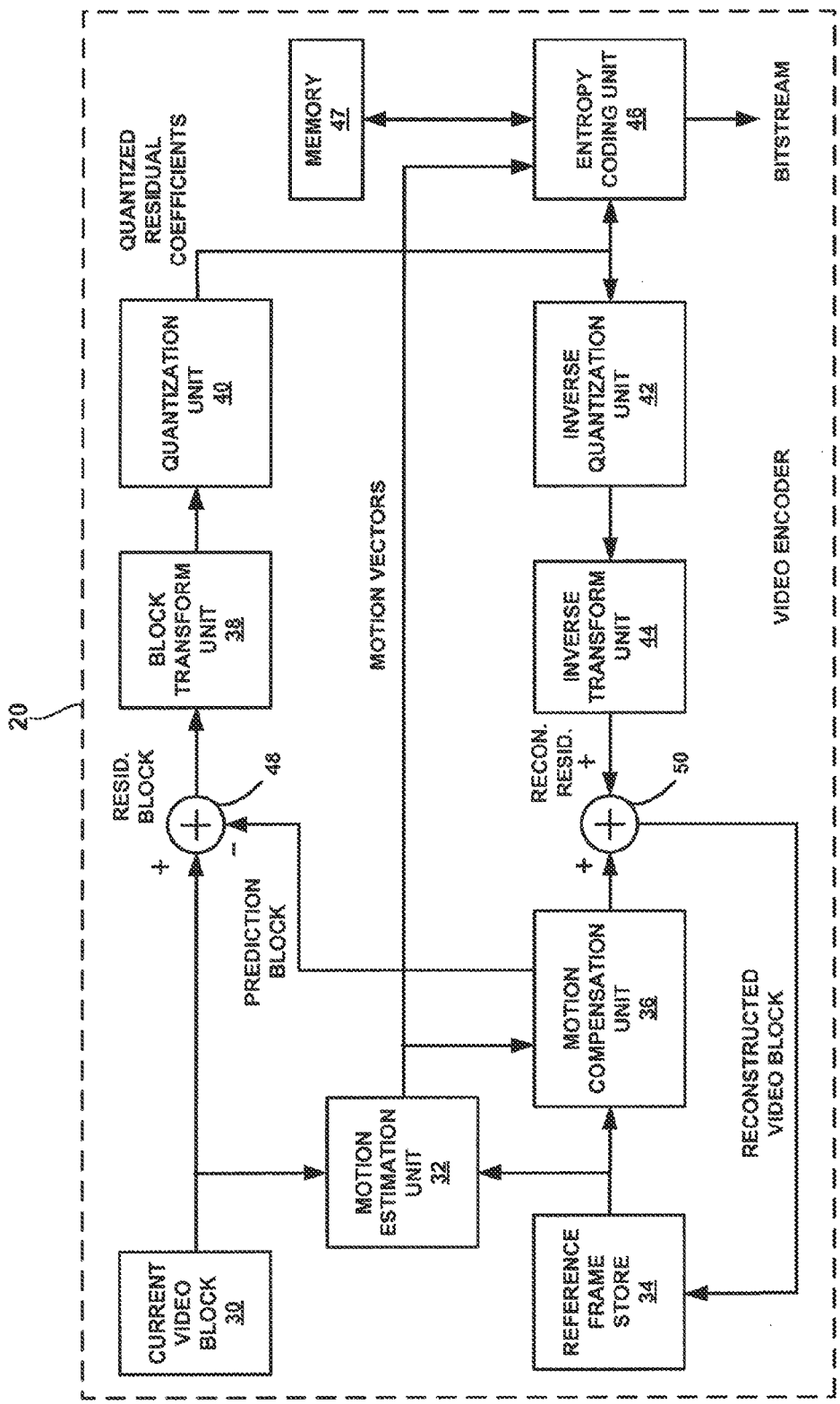
FIG. 2 is a block diagram illustrating an example of a video encoder.

FIG. 2 is a block diagram illustrating an example of a video encoder. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching video blocks between adjacent frames.

As shown in FIG. 2, video encoder 20 receives a current video block 30 within a video frame to be encoded. In the example of FIG. 2, video encoder 20 includes motion estimation unit 32, reference frame store 34, motion compensation unit 36, block transform unit 38, quantization unit 40, inverse quantization unit 42, inverse transform unit 44 and entropy encoding unit 46. Video encoder 20 also may include memory including memory 47. An in-loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 32 compares video block 30 to blocks in one or more adjacent video frames to generate one or more motion vectors. The adjacent frame or frames may be retrieved from reference frame store 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes.

In operation, motion estimation unit 32 identifies one or more blocks in adjacent frames that most closely match the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 36 forms a prediction video block.

Video encoder 20 forms a residual video block by subtracting the prediction video block produced by motion compensation unit 36 from the original, current video block 30 at summer 48. Block transform unit 38 applies a transform, such as the 4×4 or 8×8 integer transform used in H.264/AVC, to the residual block, producing residual transform block coefficients. Quantization unit 40 quantizes the residual transform block coefficients to further reduce bit rate. Entropy encoding unit 46 entropy codes the quantized coefficients to even further reduce bit rate.

In general, video decoder 26 performs inverse operations, including decoding and parsing, to decode and reconstruct the encoded video, as will be described, e.g., with reference to FIG. 3.

Inverse quantization unit 42 and inverse transform unit 44 apply inverse quantization and inverse transformation, respectively, to reconstruct the residual block. Adder 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 3:
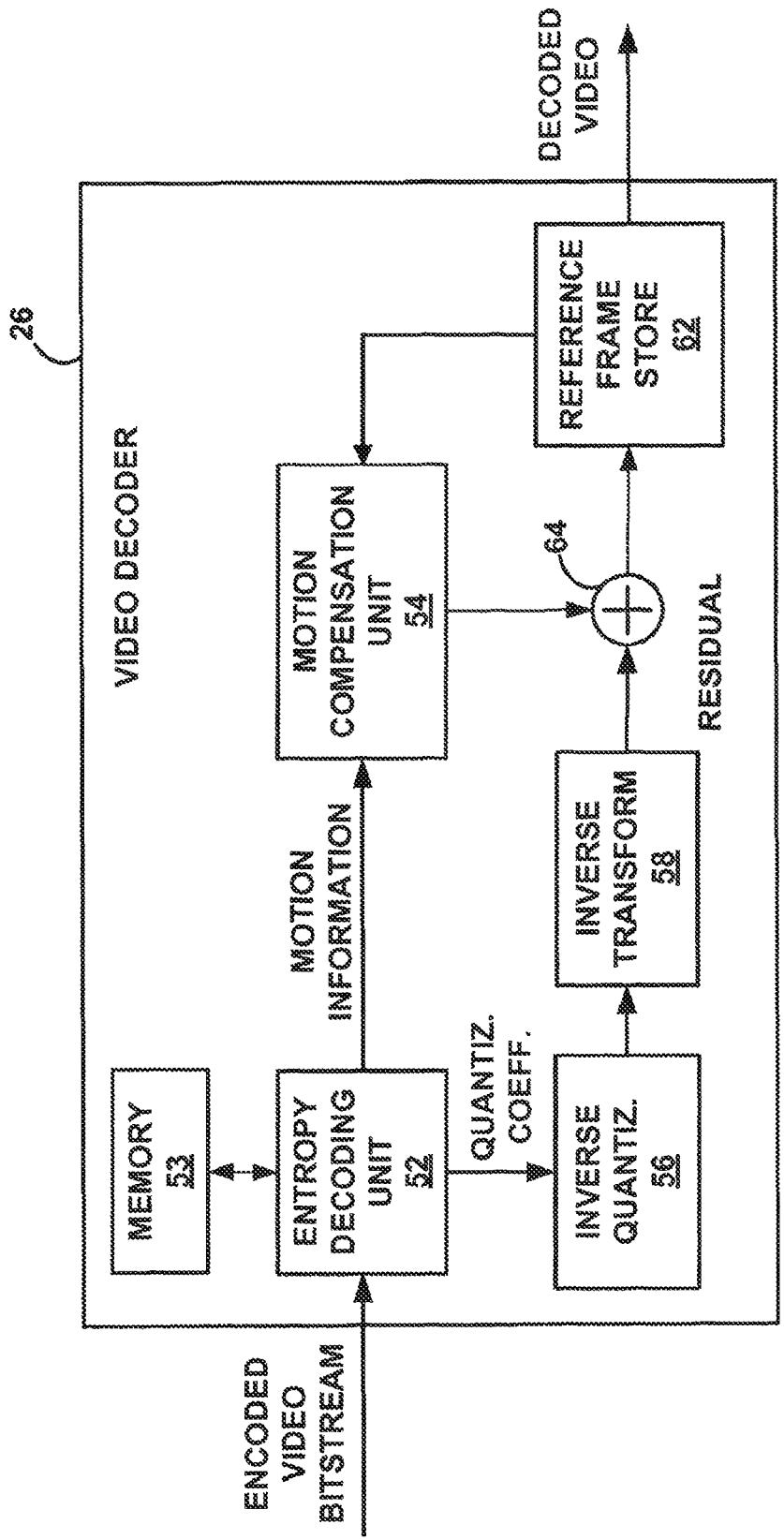
FIG. 3 is a block diagram illustrating an example of a video decoder.

FIG. 3 is a block diagram illustrating an example of a video decoder. Video decoder 26 may be formed at least in part as one or more integrated circuit devices, which may be referred to collectively as an integrated circuit device. In some aspects, video decoder 26 may form part of a wireless communication device handset. Video decoder 26 may perform intra- and inter-decoding of blocks within video frames. As shown in FIG. 3, video decoder 26 receives an encoded video bit stream from a receiver 24 (FIG. 1) that has been encoded by video encoder 20. In the example of FIG. 3, video decoder 26 includes entropy decoding unit 52, motion compensation unit 54, inverse quantization unit 56, inverse transform unit 58, and reference frame store 62. Video decoder 26 also may include memory, including memory 53, which may be used by entropy decoding unit 52 for storage and retrieval of coding data. Video decoder 26 also may include an in-loop deblocking filter (not shown) that filters the output of summer 64. Video decoder 26 also includes summer 64. FIG. 3 illustrates the temporal prediction components of video decoder 26 for inter-decoding of video blocks. Although not shown in FIG. 3, video decoder 26 also may include spatial prediction components for intra-decoding of some video blocks.

Entropy decoding unit 52 receives the encoded video bit stream and decodes from the bit stream quantized residual coefficients, macroblock coding mode and motion information, which may include motion vectors and block partitions.

Motion compensation unit 54 receives the motion vectors and block partitions and one or more reconstructed reference frames from reference frame store 62 to produce a prediction video block. Inverse quantization unit 56 inverse quantizes, i.e., de-quantizes, the quantized block coefficients. Inverse transform unit 58 applies an inverse transform, e.g., an inverse DCT or an inverse 4×4 or 8×8 integer transform, to the coefficients to produce residual blocks. The prediction video blocks are then summed by summer 64 with the residual blocks to form decoded blocks. A deblocking filter (not shown) may be applied to filter the decoded blocks to remove blocking artifacts. The filtered blocks are then placed in reference frame store 62, which provides reference frame for decoding of subsequent video frames and also produces decoded video to drive display device 28 (FIG. 1).

Various video standards use filters with different number of taps, coefficient values and may have unique filtering order requirements. Supporting each standard could require specific filters and dedicated data paths specifically designed for each of those standards. This could lead to a large area cost, and also substantially reduce system robustness to handle the emergence of new standards.

Figure 4:
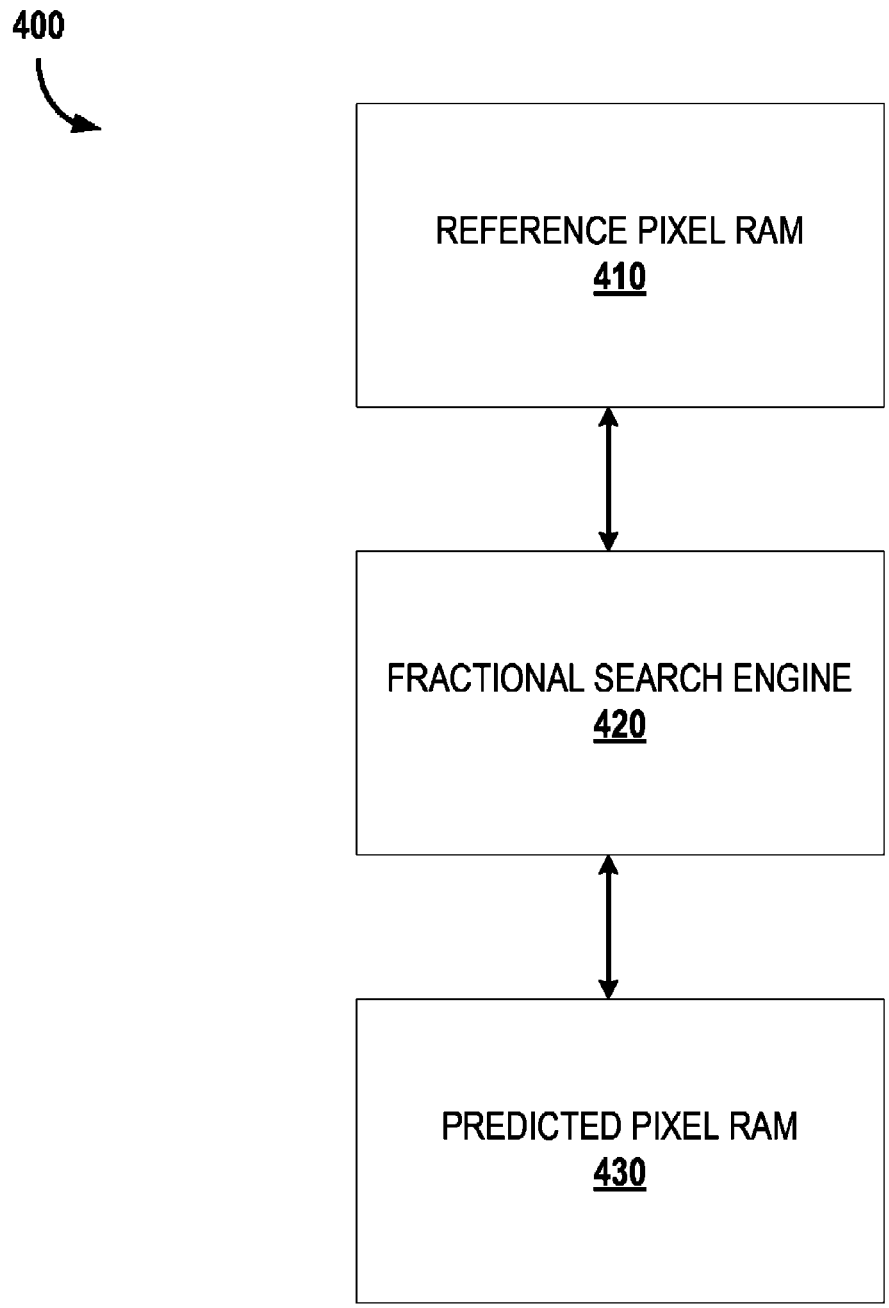
FIG. 4 is a block diagram illustrating a system for unified fractional search and motion compensation according to one implementation.

FIG. 4 is a block diagram illustrating a system for unified fractional search and motion compensation according to one implementation. The system 400 includes a reference pixel RAM 410, a fractional search engine (FSE) 420 and a predicted pixel RAM 430. The reference pixel RAM 410 stores reference pixels, i.e., data to be filtered by the FSE 420. The reference pixel RAM 410 may be implemented using one or more of RAM (e.g., DRAM, DDR SDRAM, SRAM, T-RAM, Z-RAM, TTRAM, and the like), NVRAM, or other local or remote (e.g., networked) storage medium. The FSE 420 processes reference pixel data received from the reference pixel RAM 410 and outputs predicted pixel data to the predicted pixel RAM 430. The system 400 may be included in a variety of video processing devices such as a mobile phone, a tablet computer, a digital camera, a desktop computer, a video display, a set top box, a gaming console, or other devices configured to encode and/or decode video data.

In one implementation, the system 400 handles different filtering and processing requirements for various video standards based on parameterized filters and processing architecture. Examples of the video standards include, but not limited to, H.264, MPEG4-SP, MPEG4-ASP, VC1, VP6, VP8, and High Efficiency Video Coding (HEVC). In one implementation, the parameterized filters make use of various parameters (e.g., filter coefficients, rounding, and shift parameters) which are stored in a memory, and fetched accordingly depending on the selected or determined standard. The memory may be implemented using one or more of RAM (e.g., DRAM, DDR SDRAM, SRAM, T-RAM, Z-RAM, TTRAM, and the like), NVRAM, or other local or remote (e.g., networked) storage medium. This may significantly reduce a system area (e.g., physical footprint of the system) and/or simplify the overall system configuration because only one set of filters would be required across multiple standards. Furthermore, the system 400 can handle different horizontal and vertical filter orders without increasing the system area (will be described in greater detail), thereby providing flexibility and robustness for simple extension to other existing and future standards. Extension to other existing and/or future standards can be made by merely adding filter parameters associated with those new standards in the memory without changing the filter design.

Figure 5:
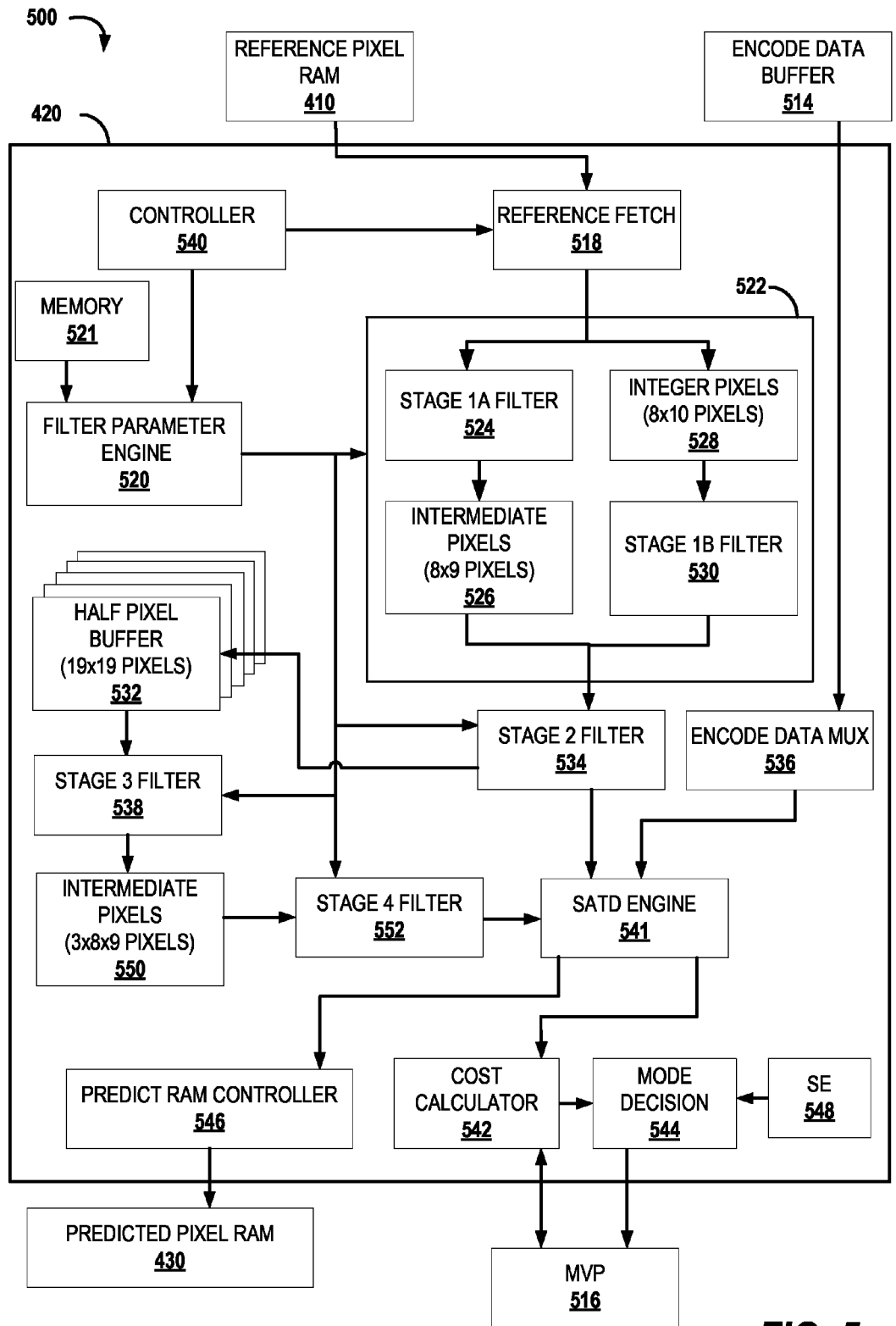
FIG. 5 is a block diagram illustrating a system for unified fractional search and motion compensation according to another implementation.

FIG. 5 is a block diagram illustrating a system for unified fractional search and motion compensation according to another implementation. The system 500 includes the reference RAM 410, an encode data buffer 514, a motion vector predictor (MVP) 516, the FSE 420, and the predicted pixel RAM 430. In the present implementation, the FSE 420 includes a controller 540, a filter parameter memory 521, a reference fetch 518, a filter parameter engine 520, a stage 1 filter 522, a half pixel buffer 532, a stage 2 filter 534, a stage 3 filter 538, and a stage 4 filter 552.

In the FIG. 5 implementation, the FSE 420 also includes a sum of average transformed differences (SATD) engine 541, a cost calculator 542, a mode decision element 544, a predict RAM controller 546 and a spatial estimator (SE) 548. Depending on the implementation, additional elements may be added to and/or others removed from the system 500. For example, when only certain types of filtering scheme (e.g., types 1 and 2 filtering schemes) are used, the half pixel buffer 532 and the stage 3 filter 538 can be omitted from the system 500. Furthermore, the system 500 may perform the parameterized filtering without one or more of the encode data buffer 514, the MVP 516, the encode data multiplexer 536, the cost calculator 542, the mode decision element 544, the SATD engine 541, the predict RAM controller 546 and the SE 548.

The reference fetch 518 fetches reference pixels from the reference RAM 410. The memory 521 can be a RAM and stores various filter parameters associated with multiple video standards as discussed above. In one implementation, the memory 521 stores the filter parameters in a table which are associated with video standards, respectively. The filter parameter engine 520 retrieves appropriate (or corresponding) filter parameters from the memory 521 and provides them to one or more of the stage 1 filter 522, the stage 2 filter 534, the stage 3 filter 538, and the stage 4 filter 552. In one implementation, the filter parameter engine 520 may not provide filter parameters to the stage 3 filter 538 and the stage 3 filter 538 filters reference pixels using existing (e.g., previously provided) filter parameters. Filter parameters may also be configurably provided to the stage 4 filter 552. In one implementation, as shown in FIG. 5, the memory 521 is located outside the filter parameter engine 520. Alternatively, the memory 521 may be located inside the filter parameter engine 520.

The controller 540 controls the reference fetch 518 and the filter parameter engine 520 such that the reference fetch 518 initiates the fetching of reference pixels and the filter parameter engine 520 is activated to provide proper parameters to the stage 1 filter 522 and the stage 2 filter 534. In one implementation, the controller 540 controls the reference fetch 518 and the filter parameter engine 520 such that the reference pixel fetching and filter parameter providing are substantially simultaneously performed. The controller 540 may determine which video standard is being used for video encoding and decoding in the system 500 and control the filter parameter engine 520 accordingly such that appropriate filter parameters are provided to the stage 1 filter 522 and the stage 2 filter 534.

For example, if a first set of filter parameters are stored in the memory 521 for H.264 and the controller 540 determines that the H.264 standard is being used for the system 500, the controller 540 controls the filter parameter engine 520 to pump the first set of filter parameters to the stage 1 filter 522 and the stage 2 filter 534. As another example, if a second set of filter parameters are stored in the memory 521 for VP8 and the controller 540 determines that the VP8 standard is being used for the system 500, the controller 540 controls the filter parameter engine 520 to provide the second set of filter parameters to the stage 1 filter 522 and the stage 2 filter 534.

The controller 540 may determine which video standard is being used for video encoding and decoding based on, for example, the set of FSE registers, such as a register configured to store information associated with processes executing on the device (e.g., software register). The registers may be programmed by different entities depending on encode/decode modes. In the encode mode, the host may program the FSE registers. For example, the encoding device may set a value in the FSE register indicating the video standard. The indication may be associated with a specific portion of video data or may be used for all video data processed by the encoder. Accordingly, the FSE may be dynamically configured to encode video data according to different standards. If implemented in a decoding device, the stream parser may parse the video stream, extract the standard information from the header, and store it into the FSE registers. As with the encoding, the standard information may be stored once for the decoder or associated with each video stream. Accordingly, the FSE may be dynamically configured to decode video data of different standards. In other implementations, the standard information may be provisioned to the video data processing device and stored FSE register. For example, the standard information may be transmitted via a network (e.g., over the air) to the device. In some implementations, the standard information may be stored in FSE register by an application. In this way, multiple applications which may operate according to different standards may share the FSE by dynamically configuring the FSE according to each application's operational needs.

In one implementation, as shown in FIG. 5, the controller 540, the memory 521 and the filter parameter engine 520 are located inside the FSE 420. Alternatively, at least one of the controller 540, filter parameter engine 520, and memory 521 may be located outside and in data communication with the FSE 420. In the FIG. 5 implementation, the controller 540, the memory 521 and the filter parameter engine 520 are separate elements and communicate data with each other. Alternatively, at least two of the controller 540, filter parameter engine 520, and memory 521 may be combined to a single element. For example, the memory 521 may be incorporated into the filter parameter engine 520. As another example, the filter parameter engine 520 may be incorporated into the controller 540. As another example, the memory 521 and the filter parameter engine 520 may be incorporated into the controller 540.

The stage 1 filter 522 filters the fetched reference pixels based on the specific filter parameters received from the filter parameter engine 520, and outputs filtered pixels to the stage 2 filter 534. In one implementation, as shown in FIG. 5, the stage 1 filter 522 includes a stage 1A filter 524, an integer pixel block 528, an intermediate pixel block 526, and a stage 1B filter 530. The stage 1A filter 524 filters the fetched reference pixels based on the specific filter parameters received from the filter parameter engine 520, and outputs the intermediate pixels 526. The intermediate pixels 526 may have a size of, for example, 8×9 pixels or 6×9 pixels. The stage 1B filter 530 filters the fetched reference pixels (here, integer pixels 528 having a size of, for example, 8×10 pixels) based on the received filter parameters, and outputs filtered pixels to the stage 2 filter 534.

The stage 2 filter 534 filters the output of the stage 1 filter based on the specific parameters received from the filter parameter engine 520, and outputs filtered pixels to the SATD engine 541. For some filtering processes (e.g., type 3 or HEVC type 1 filtering), the output of the stage 2 filter 534 may also be provided to the half pixel buffer 532. In one implementation, as shown in FIG. 5, the half pixel buffer 532 may have a size of 19×19 pixels. The size of the pixels in the intermediate pixels 526, integer pixels 528, and half pixel buffer 532 are merely examples, and the pixels may have different processing sizes depending on the implementation. Furthermore, the FSE 420 may dynamically determine the pixel size for one or more of the intermediate pixels 526, integer pixels 528, and half pixel buffer 532. For example, the pixel size may be determined based on the video standard, the video data (e.g., bitrate, quality, error rate). The size may be stored in the FSE register and provided to the FSE 420.

The stage 3 filter 538 filters the output of the half pixel buffer 532, and outputs filtered pixels to an intermediate pixel block 550. As shown the intermediate pixel block 550 is a 3×8×9 pixel block. The stage 4 filter 552 may obtain pixel values from the intermediate pixel block 550 and further filter the values. The filtered values may then be provided to the SATD engine 541.

The stage 3 filter 538 may perform bilinear filtering on the output of the half pixel buffer 532. The stages 1 and 2 filters can be used for all types of filtering scheme (e.g., types 1-3), and the half pixel buffer 532 and the stage 3 filter can only be used for a certain type of filtering (e.g., type 3) and/or for certain standards (e.g., type 1 HEVC) as will be described further below.

The encode data multiplexer 536 multiplexes encoded data received from the encode data buffer 514 and provides the multiplexed data to the SATD engine 541. The SATD engine 541 is configured to generate a value indicating the sum of the absolute transform differences. In one implementation, the generation of this value includes performing a transform (e.g., Hadamard) on the residual pixels to obtain a difference between filtered pixels and the multiplexed data. The sum of the absolute values of the transform coefficients may be used as the value for the SATD score. The cost calculator 542 estimates a rate-distortion cost (e.g., inter-cost) based on the SATD score received from the SATD engine 541 and a predicted motion vector received from the MVP 516. In the implementations shown in FIG. 5, the cost calculator 542 may also receive values from the spatial estimator 548 as inputs to the cost calculation.

The spatial estimator (SE) 548 performs intra prediction searches to find the best shape and its intra prediction modes. It also estimates a rate-distortion cost (intra-cost) based on a local SATD score, and the neighbor modes received from the motion vector predictor 516. The mode decision element 544 decides, based on the calculated cost and the intra prediction search result, the best of various modes, such as inter mode and intra mode, which has the minimum cost value. The predict RAM controller 546 arranges and organizes the predicted pixels buffered in the SATD engine 541, and provides the predicted pixel values to the predicted pixel RAM 430.

The system 500 shown in FIG. 5 may be configured to perform one or both of encoding and decoding operations. For example, the system 500 may be used for unified fractional search (encoding) and motion compensation (decoding) according to one implementation. As a further non-limiting advantage, the same system 500 may be used to encode and decode thereby reducing the amount of hardware that may be needed to process video data. This may be advantageous, for example, in a wireless communication device which generally includes a compact design for portability of the device.

To encode video data, the reference fetch 518 may provide the reference pixel values retrieved from the reference pixel RAM 410 as integer pixels 528 to the stage 1B filter 530. The stage 1B filtered pixel values are provided to the stage 2 filter 534. In some implementations, such as where a type 3 filtering scheme (described below) is selected, the values may be further filtered by the stage 3 filter 538 via the half pixel buffer 532. The filtered values may be filtered further by the stage 4 filter 552 and then provided to the SATD engine 541 along with information from the encode data buffer 514. The difference value generated by the SATD engine 541 is provided to the cost calculator 542. As part of encoding, the FSE 420 generates predict pixels for motion vector (MV) candidates. The candidates may be discarded after the MV cost is obtained. In some implementations, the candidates may be stored for subsequent encoding processing of the reference pixels or other pixels of the video data. The cost calculator 542 selects the best encode MV which may be processed via the below described decode path to generate predict pixels.

The decode obtains the reference pixels from the reference pixel RAM 410 via the reference fetch 518. The pixel values are provided to the stage 1A filter 524. The filtered intermediate pixel values 526 are then provided to the stage 2 filter 534. In some implementations, such as type 3 filtering implementations, the stage 2 filtered pixel values are provided half pixel buffer 532. In such implementations, the stage 3 filter 538 generates further filtered pixel values as described below. The filtered values may be filtered further by the stage 4 filter 552. The filtered pixel values are provided to the SATD engine 541 and then provided to the predict RAM controller 546. The RAM controller 546 stores the pixel information in the predict pixel RAM 430. Under the decode path, the FSE 420 generates predict pixels for reference motion vector through the stage 1 filter 522 and the stage 2 filter 534 and stores them in the predict pixel RAM 430 for subsequent processing.

Figure 6:
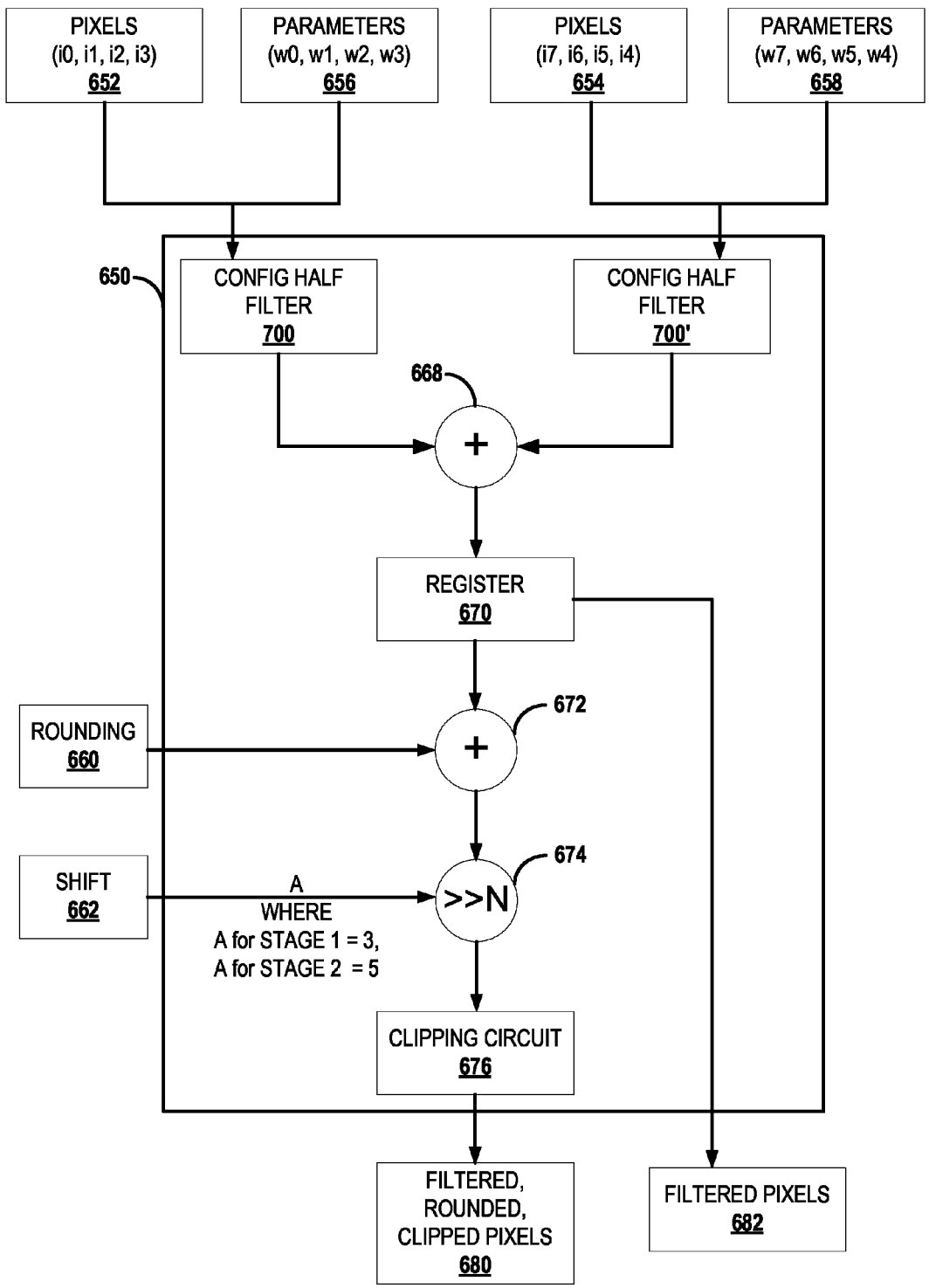
FIG. 6 illustrates a parameterized full filter according to one implementation.
Figure 7:
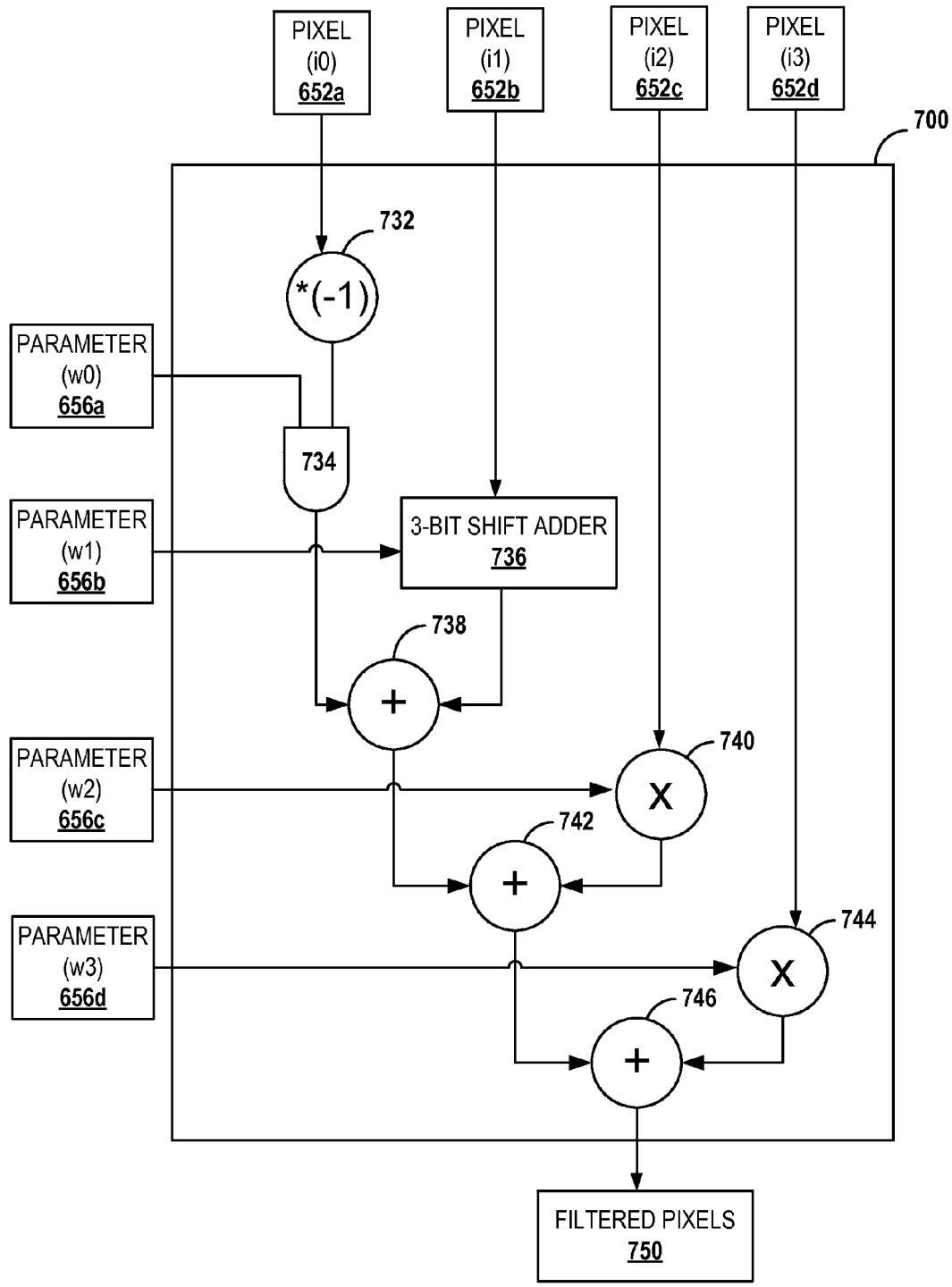
FIG. 7 illustrates a parameterized half filter according to one implementation.

FIG. 6 illustrates a parameterized full filter according to one implementation. FIG. 7 illustrates a parameterized half filter 700 according to one implementation. Depending on the implementation, additional elements may be added to and/or others removed from the filters 650 and 700 shown in FIG. 6 and FIG. 7. The filter 650 is a parameterized full filter which can be used for the stages 1 filter 522 and the stage 2 filter 534. The filter 650 includes two half filters 700 and 700', adders 668 and 672, a register 670, a shifter (>>N) 674, and a clipping circuit 676.

Referring to FIG. 6, the half filter 700 filters incoming pixels ($i_0$ through $i_3$) 652 based on filter parameters ($W_0$ through $W_3$) 656 received from the filter parameter engine 520. The filter parameters may include filtering coefficients, rounding values, shift values, other constant values, configuration flags, or other values used during the filtering process. The half filter 700' filters incoming pixels ($i_7$ through $i_4$) 654 based on filter parameters ($W_7$ through $W_4$) 658 received from the filter parameter engine 520. The outputs of the two half filters 700 and 700' are combined by the adder 668. In one implementation, as shown in FIG. 6, the register 670 may be included to ensure that the timing of the data path is aligned with other processes for pipelining purposes. The adder 672 is configured to combine (e.g., sum) the rounding parameters 660 received from the filter parameter engine 520 and the output of the register 670. The shifter 674 is configured to shift the output of the adder 672 based on shift parameters 662 received from the filter parameter engine 520.

After processing the reference pixels (e.g., filtering, interpolation, rounding, shifting), the processed pixel values can be outside a valid range. For example, in some implementations, pixels may be represented using pixel values from 0 to 255. Other ranges of values may be included in some implementations such as from 0 to 15, 0 to 1024, or 0 to 4096. The clipping circuit 676 may obtain the range from a memory included in the device. The range may be static or dynamically determined such as based on the video standard used to process the video data, a characteristic of the video data (e.g., bitrate, error, noise, header information), or a characteristic of the device (e.g., device load, available device power, device connectivity status). The clipping circuit 676 is configured to clip the output of the shifter 674 (filtered values) to the configured range. For example, in an implementation where the pixel values may be represented from 0 to 255, if an input to the clipping circuit 676 is less than 0, the clipping circuit 676 outputs 0. Furthermore, if an input to the clipping circuit 676 is greater than 255, the clipping circuit 676 outputs 255. For other input values, the clipping circuit 676 outputs the input value. Parameter A, shown in FIG. 6 represents the bit-width of that signal. Depending on which stage it is used, the bit-width may be different. In one implementation, as shown in FIG. 6, parameter A can be 3 for the stage 1 filter 522 and 5 for the stage 2 filter 534.

As shown in FIG. 6, the parameterized full filter 650 provides two outputs, a filtered, rounded, clipped pixel value output 680 and a filtered pixel value output 682. One or both of these outputs may be used for further processing consistent with the processes described herein.

Referring to FIG. 7, the half filter 700 includes an inverse multiplier 732, a logic gate 734, a 3-bit shift adder 736, adders 738, 742 and 746, and multipliers 740 and 744. In one implementation, as shown in FIG. 7, the inverse multiplier 732 and the logic gate 734 work together such that the first parameter ($W_0$) is either −1 or 0. For example, if incoming parameter ($W_0$) 656$a$ is 0, the logic gate 734 zeros out the incoming pixel ($i_0$) 652$a$. If incoming parameter ($W_0$) 656$a$ is 1, the inverse multiplier 732 and the logic gate 734 convert the incoming pixel ($i_0$) 652$a$ into −$i_0$. The logic gate 734 can be, for example, an AND gate.

The 3-bit shift adder 736 shift-adds the parameter ($W_1$) 656$b$ and pixel ($i_1$) 652$b$. The adder 738 combines (e.g., sums) the outputs of the logic gate 734 and the 3-bit shift adder 736. The multiplier 740 multiplies the parameter ($W_2$) 656$c$ and pixel ($i_2$) 652$c$. The adder 742 combines (e.g., sums) the outputs of the adder 738 and the multiplier 740. The multiplier 744 multiplies the parameter ($W_3$) 656$d$ and pixel ($i_3$) 652$d$. The adder 746 combines (e.g., sums) the outputs of the adder 742 and the multiplier 744 to produce the filtered pixel values 750. The filtered pixel values 750 may be provided for further processing consistent with the processes described herein.

Figure 8A:
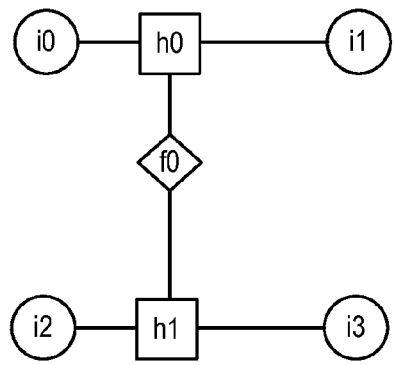
FIGS. 8A, 8B, and 8C illustrate pixel diagrams for respective types of filtering which may be implemented in an implementation of the FSE described.
Figure 8B:
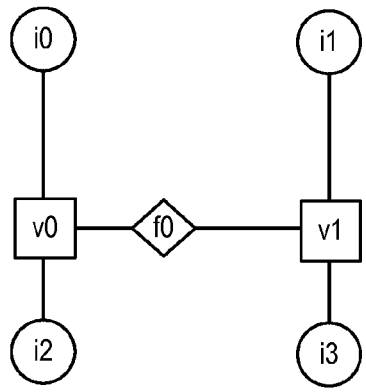
Figure 8C:
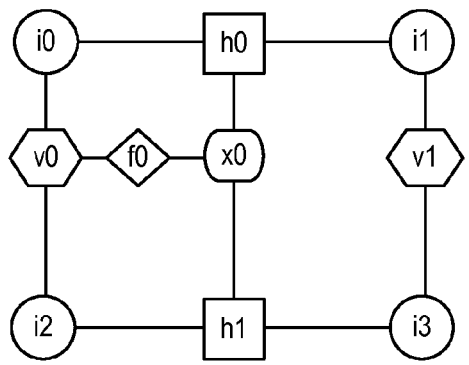

FIGS. 8A, 8B, and 8C illustrate pixel diagrams for respective types of filtering which may be implemented in an implementation of the FSE described.

Referring to FIG. 8A, in the type 1 filtering scheme, the stage 1 filter 522 horizontally filters incoming pixels (i0, i1, i2, and i3), and then the stage 2 filter 534 vertically filters the horizontally filtered pixels (h0 and h1) to generate a filtered pixel (f0). That is, in the type 1 filtering scheme, the horizontal filtering is performed first and then the vertical filtering is performed on the horizontally filtered pixels (h0 and h1). Type 1 filtering scheme is generally used for video standards such as VP6, VP8, HEVC, H.264 Chroma, and MPEG4-SP.

Referring to FIG. 8B, in the type 2 filtering scheme, the stage 1 filter 522 vertically filters incoming pixels (i0, i1, i2, and i3), and then the stage 2 filter 534 horizontally filters the vertically filtered pixels (v0 and v1) to generate a filtered pixel (f0). That is, in the type 2 filtering scheme, the vertical filtering is performed first and thereafter the horizontal filtering is performed on the vertically filtered pixels (v0 and v1). Type 2 filtering scheme may be used for processing video data for the VC1 standard.

Referring to FIG. 8C, in the type 3 filtering scheme, the stage 1 filter 522 horizontally filters incoming pixels (i0, i1, i2, and i3) to generate horizontal filtered pixel values (h0 and h1). The stage 1 filter 522 also vertically filters the incoming pixels (i0, i1, i2, and i3) to generate vertical filtered pixel values (v0 and v1). Thereafter, the stage 2 filter 534 vertically filters the horizontal filtered pixel values (h0 and h1) and vertical filtered pixel values (v0 and v1) to generate half pixel (x0). The half pixel (x0) is filtered in the stage 3 filter 538 to generate the filtered pixel (f0). The stage 3 filter may be configured to generate the filtered pixel value (f0) through, for example, bilinear filtering. Type 3 filtering scheme is generally used for video standards such as H.264 Luma and MPEG-ASP.

FIGS. 9A, 9B, 9C, 9D, and 9E illustrate functional block diagrams for pipeline configurations in an FSE which may be used to perform the filtering shown in FIGS. 8A, 8B, and 8C. In one implementation, the system 500 can be used for a 4-stage filter design to support various vertical/horizontal filter order requirements in various video standards. For example, the system 500 can support all of types 1-3 filtering schemes. If a given video standard uses either the type 1 or type 2 filtering scheme, one or more of the half pixel buffer 532, the stage 3 filter 538, and the stage 4 filter 552 can be omitted from the FSE 420. In some implementations, information may flow through the omitted element(s) but not be processed by the element(s) (e.g., passed through).

The diagrams of FIGS. 9A, 9B, 9C, 9D, and 9E may omit certain elements included in the FSE shown in FIG. 5. It will be understood that the diagrams of FIGS. 9A, 9B, 9C, 9D, and 9E are intended to show pipeline configurations. As such, the elements not shown in FIGS. 9A, 9B, 9C, 9D, and 9E may exist in a FSE, but not be included in the referenced pipeline.

Figure 9A:
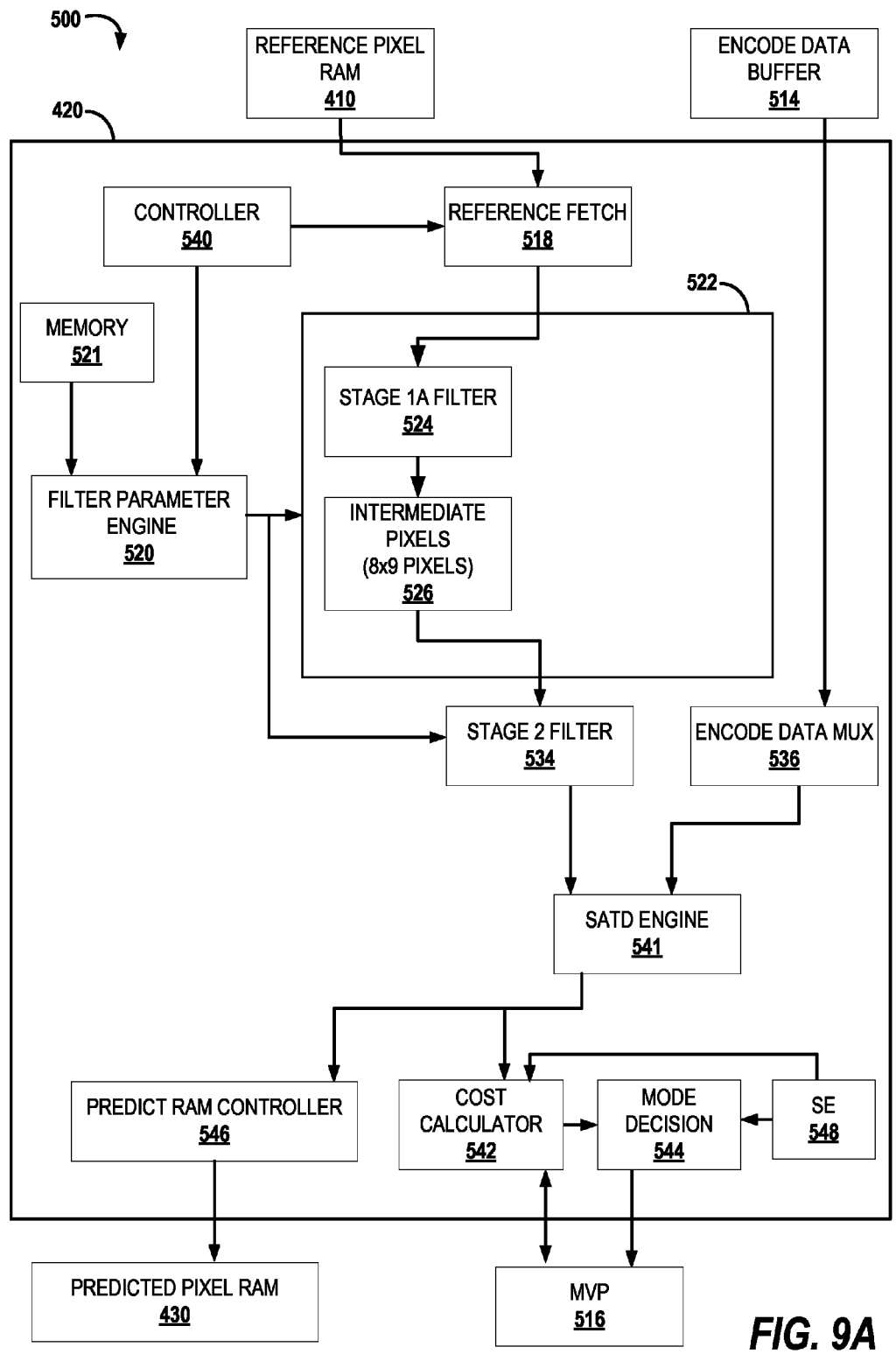
FIGS. 9A, 9B, 9C, 9D, and 9E illustrate functional block diagrams for pipeline configurations in an FSE which may be used to perform the filtering shown in FIGS. 8A, 8B, and 8C.

FIG. 9A shows a functional block diagram for a pipeline configuration in an FSE for performing the filtering shown in FIG. 8A. Under the type 1 filtering scheme, the reference fetch 518 obtains the pixel values for the video data from the reference pixel RAM 410. The pixel values are provided to the stage 1A filter 524. The resulting intermediate pixels 526 are provided to the stage 2 filter 534 to generate the final filtered pixel value. The pipeline shown in FIG. 9A may be used for VP8 video processing. Filter parameters associated with VP8 may be provided to the stage 1 filter 522 and the stage 2 filter 534.

By providing alternative filter parameters, the pipeline shown in FIG. 9A may be used for HEVC decoding. In such implementations, the predict pixels for reference motion vector(s) are generated through the filtering by the stage 1A filter 524 and the stage 2 filter 534. The generated values may then be written to the predict pixel RAM 430.

Figure 9B:
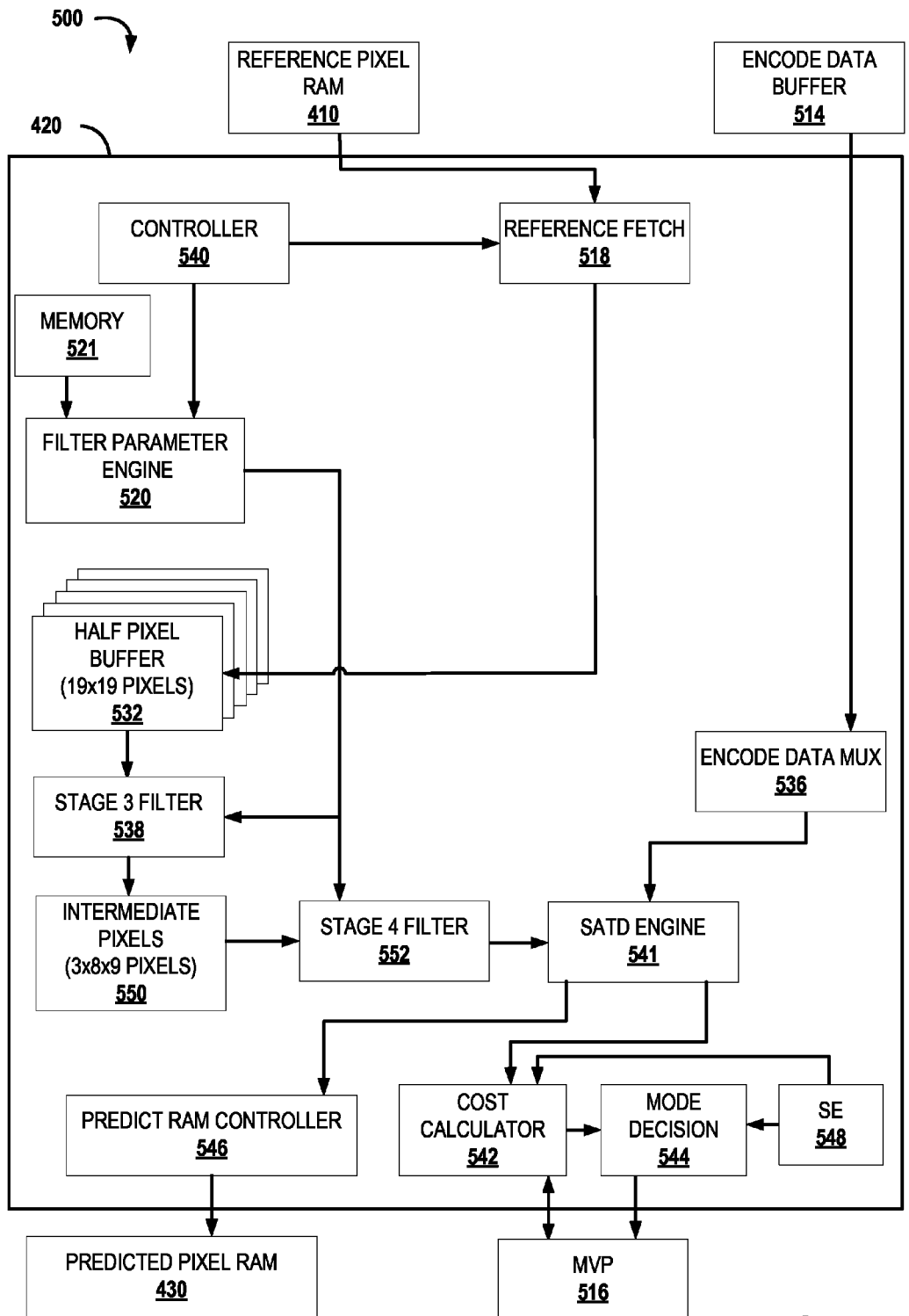

FIG. 9B shows a functional block diagram for another pipeline configuration in an FSE for performing the filtering shown in FIG. 8A. The pipeline shown in FIG. 9B can be used to perform type 1 filtering during, for example, HEVC encoding. The stage 3 filter 538 and the stage 4 filter 552 may receive filter parameters from the filter parameter engine 520 for performing the HEVC encoding. The reference pixels are routed to the half pixel buffer 532 for processing as described above, such as in reference to FIG. 5.

Figure 9C:
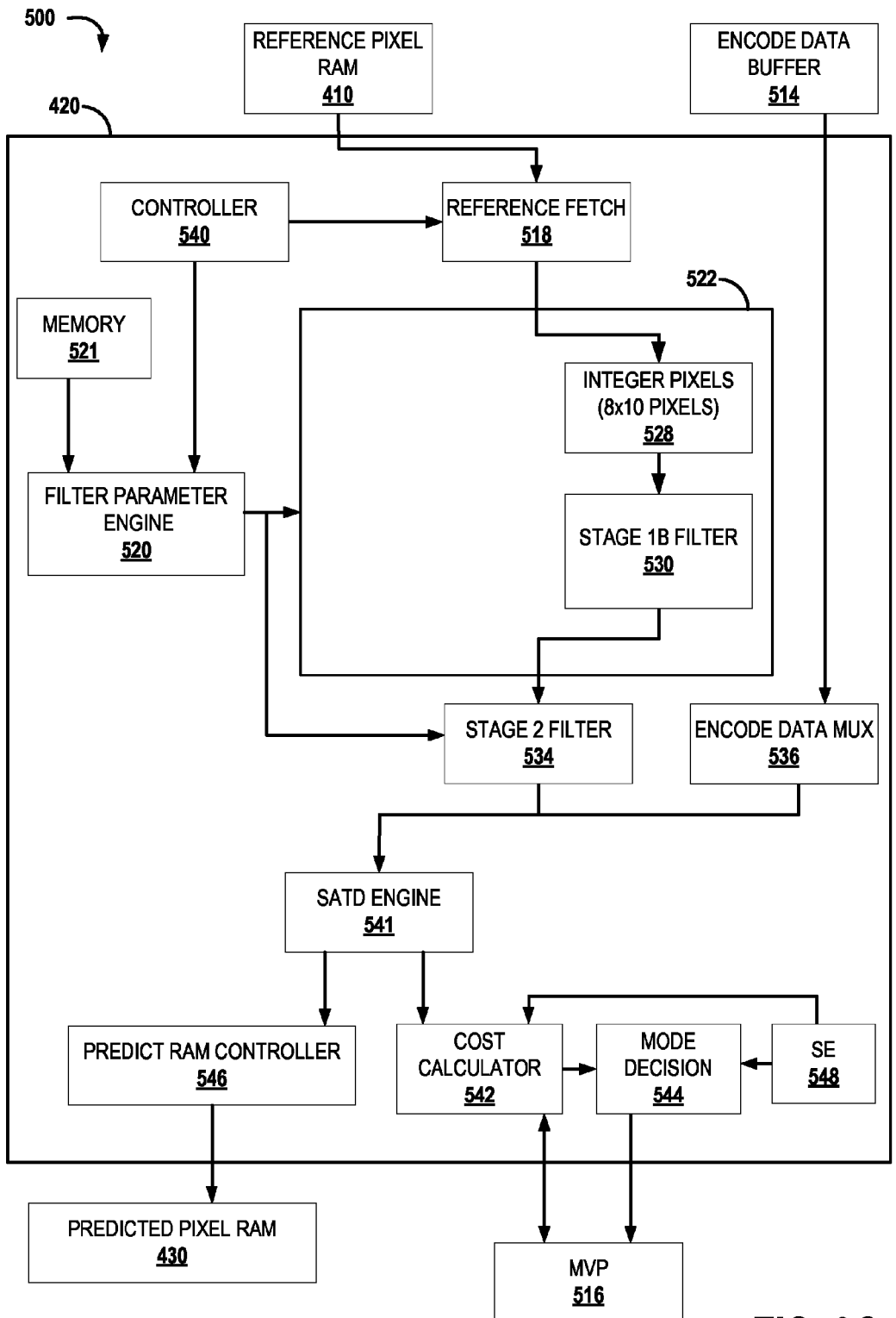

FIG. 9C shows a functional block diagram for a pipeline configuration in an FSE for performing the filtering shown in FIG. 8B. For example, the pipeline shown in FIG. 9C may be used for VC1 video processing. Under the type 2 filtering scheme, the reference fetch 518 obtains the pixel values from the reference pixel RAM 410. The integer pixel values 528 are provided to the stage 1B filter 530. The stage 1B filter 530 filters the provided pixels to generate intermediate pixel values which are provided to the stage 2 filter 534. The stage 2 filter 534 generates the final filtered pixel value.

Figure 9D:
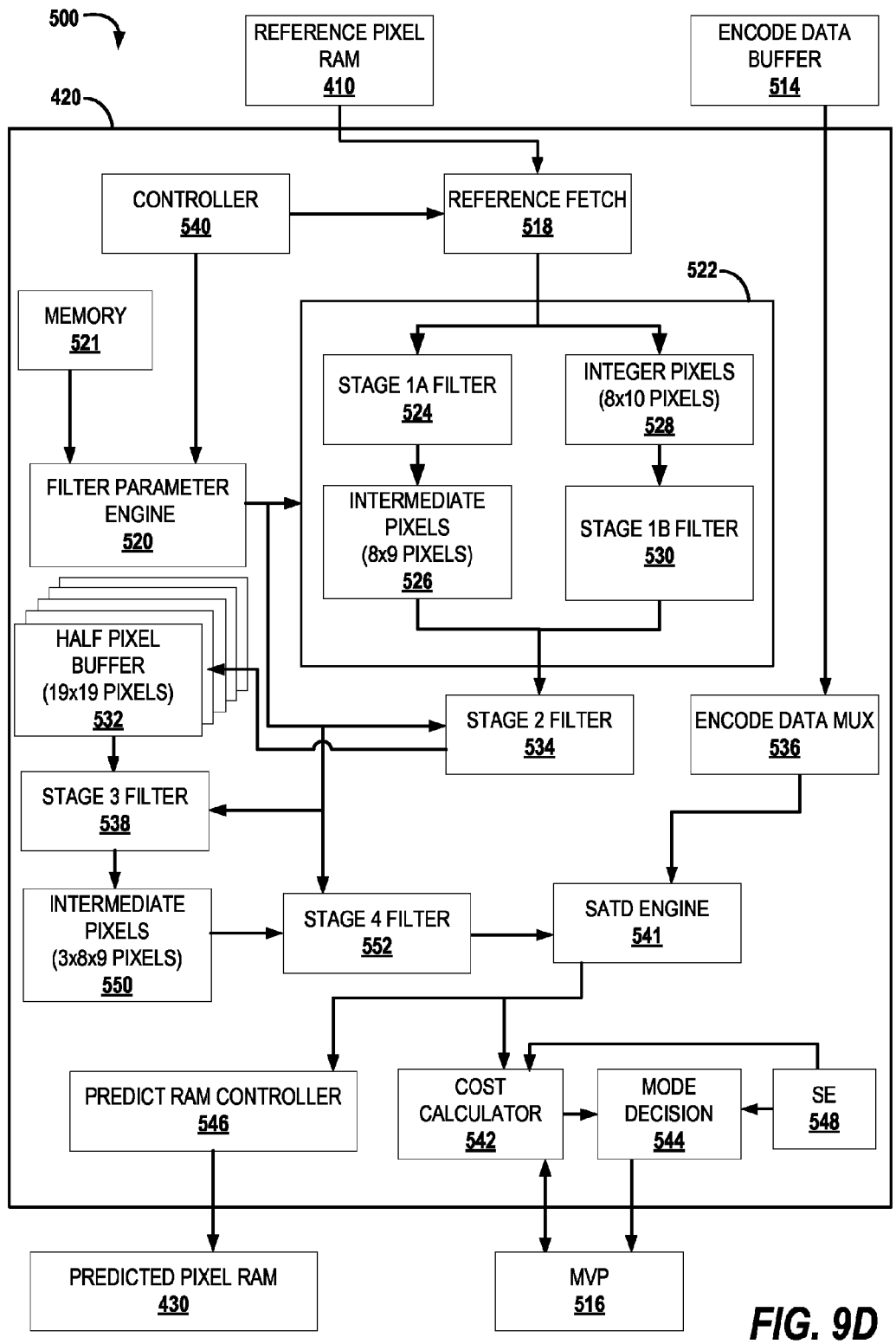

FIG. 9D shows a functional block diagram for a pipeline configuration in an FSE for performing the filtering shown in FIG. 8C. For example, the pipeline shown in FIG. 9D may be used for H.264 or MP4ASP (e.g., MPEG 4-ASP) video processing. Under the type 3 filtering scheme, the reference fetch 518 obtains the pixel values from the reference pixel RAM 410. The values are provided to the stage 1A filter 524 and as the integer pixels 528 to the stage 1B filter 530. The stage 1A filter 524 provides the intermediate pixel values 526 to the stage 2 filter 534. The stage 1B filter 530 also provides filtered pixel values to the stage 2 filter 534. The stage 2 filter 534 generates filtered pixel values which are provided to the half pixel buffer 532. The stage 3 filter 538 may obtain the values stored in the half pixel buffer 532 and generate the final filtered pixel value.

Figure 9E:
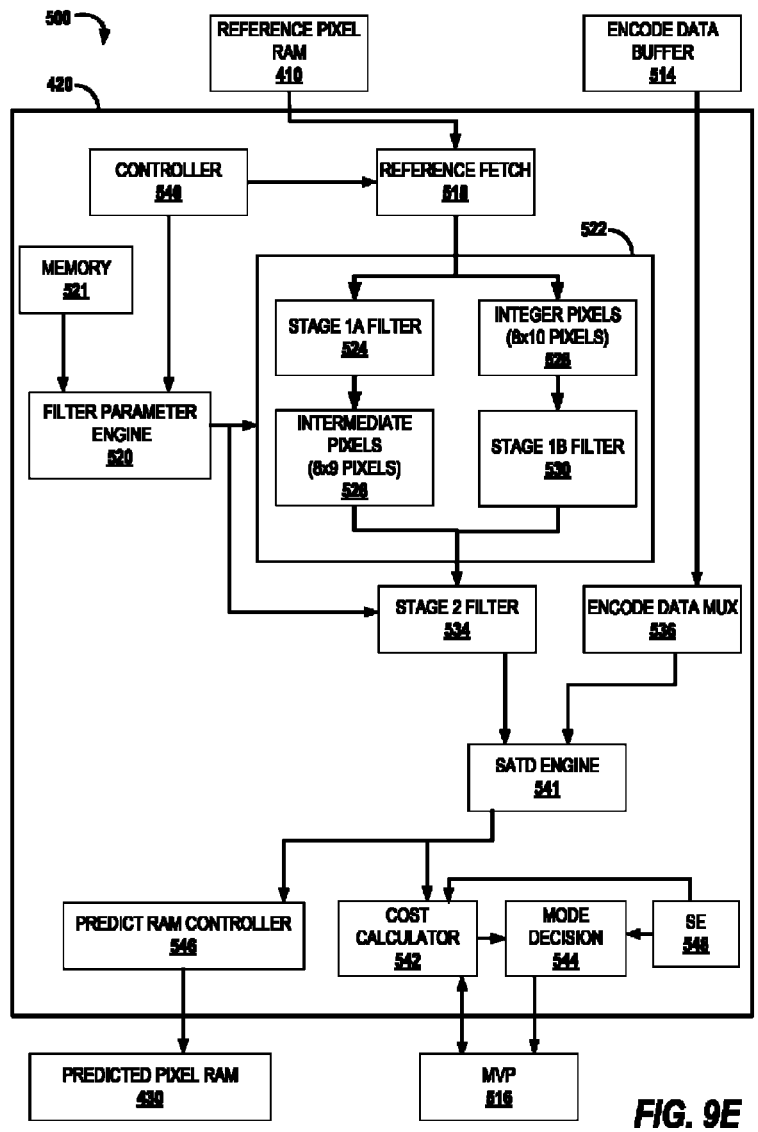

FIG. 9E shows a functional block diagram for another pipeline configuration in an FSE for performing the filtering shown in FIG. 8C. For example, the pipeline shown in FIG. 9E may be used for type 3 filtering for high efficiency video coding encoding. The pipeline shown generates predict pixels for motion vector candidates. Once the motion vector cost is obtained, the predict pixels may be removed from memory. The cost may be provided to the mode decision to select the best encode motion vector. The best encode motion vector then proceeds through an HEVC decode path to generate predict pixels and write out the results. In some implementations, the pipelines shown in FIGS. 9B and 9E may be executed in parallel to expedite the video processing (e.g., HEVC encoding).

The fractional search engine 420 may generally be considered to include two pairs of filters, a stage 1 and stage 2 pair along with a stage 3 and stage 4 pair. By altering the filter parameters provided to the filter pairs, the video processing performed by the fractional search engine 420 may be adjusted to accommodate various video standards. Table 1 provides an example summary of the configurations described in FIGS. 9A, 9B, 9C, 9D, and 9E. For the video processed by the fractional search engine 420, such as those shown in Table 1, information may flow through the omitted element(s) but not be processed by the element(s) (e.g., passed through).

TABLE 1

| Video Processing | Stage 3/Stage 4 Filter Pair Type | Stage 1/Stage 2 Filter Pair Type |
|---|---|---|
| HEVC Encode | Type 1 | Type 3 |
| HEVC Decode | n/a | Type 1 |
| H.264 | Type 3 | Type 3 |
| MP4ASP | Type 3 | Type 3 |
| VP8 | n/a | Type 1 |
| VC1 | n/a | Type 2 |

Figure 10:
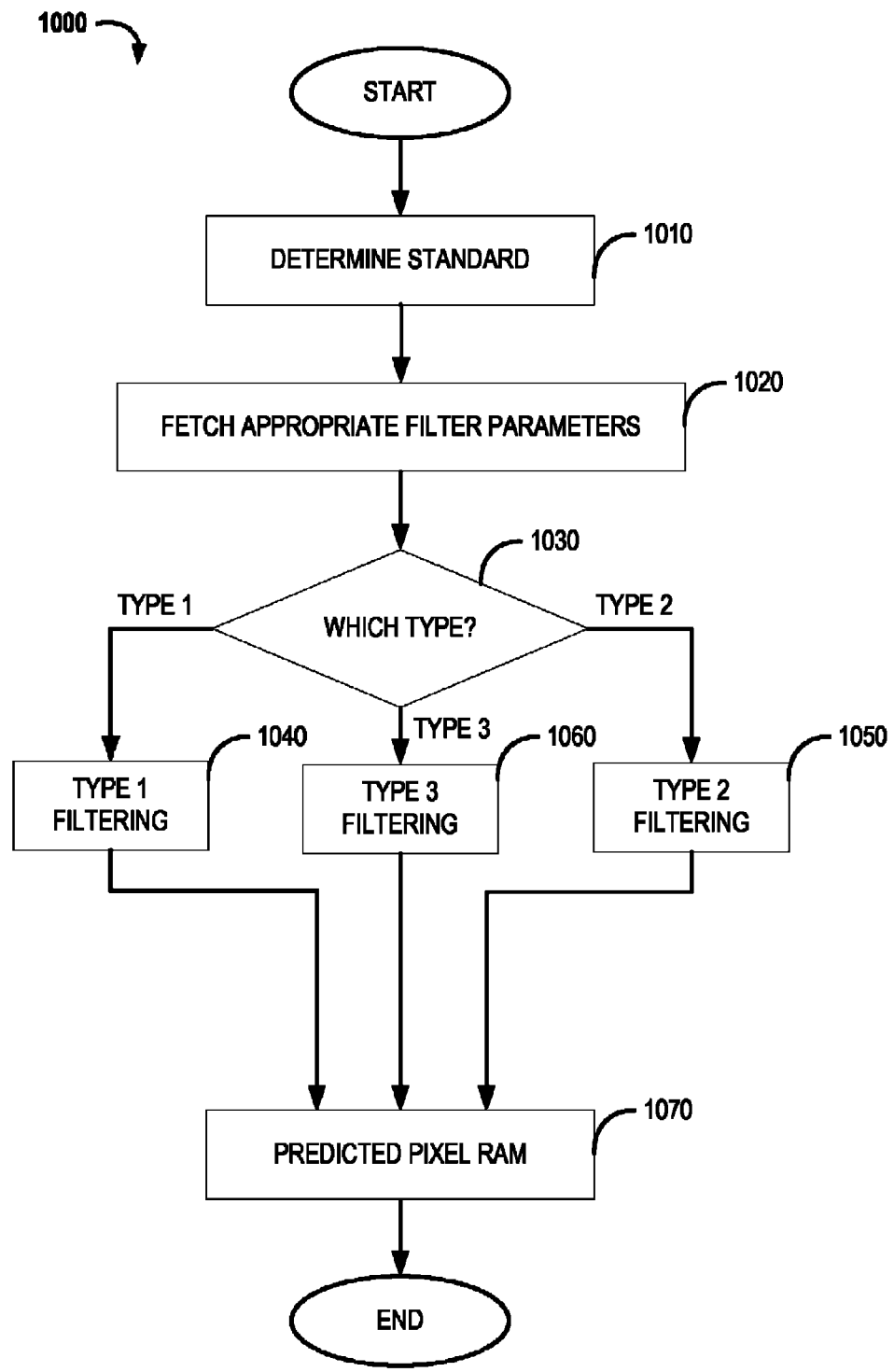
FIG. 10 illustrates encoding and decoding operations of the system for unified fractional search (e.g., encoding) and motion compensation (e.g., decoding) according to one implementation.

FIG. 10 is a flowchart illustrating a process 1000 for unified fractional search and motion compensation according to one implementation. It should be noted that the various steps described in the process 1000 may be performed in a different order than illustrated and/or some steps may be added or removed as would be understood by one of skill in the art and the teachings of this disclosure.

At node 1010, it is determined which video standard is being used for video encoding and decoding. As discussed above, the controller 540 can perform this function based on video standard identification information contained in the FSE software register. At node 1020, appropriate filter parameters are fetched and provided to the stage 1 filter 522 and the stage 2 filter 534. The controller 540 may control the reference fetch 518 and the filter parameter engine 520 such that the reference fetch 518 initiates the fetching of reference pixels and the filter parameter engine 520 is activated to provide parameters to one or more of the stage 1 filter 522, the stage 2 filter 534, the stage 3 filter 538, and the stage 4 filter 552.

At node 1030, it is determined which type of filtering scheme is used for video encoding and decoding. Once the standard is determined, the filtering type can also be determined based on the standard information as discussed above. The controller 540 can perform this function.

At node 1040, if it is determined that the type 1 filtering scheme is used, the type 1 filtering is performed as shown in FIG. 8A and FIG. 9A. At node 1050, if it is determined that the type 2 filtering scheme is used, the type 2 filtering is performed as shown in FIG. 8B and FIG. 9B. At node 1060, if it is determined that the type 3 filtering scheme is used, the type 3 filtering is performed as shown in FIG. 8A and FIG. 9A or FIG. 8C and FIG. 9C, based on the video standard used for the video encoding/decoding.

At node 1070, predicted pixels are generated and saved in the predicted pixel RAM 430. The predict RAM controller 546 may provide the predicted pixel values to the predicted pixel RAM 430.

In one implementation, the process 1000 (or at least part of the process) is implemented in a conventional programming language, such as C or C++ or another suitable programming language. In one implementation, the program is stored on a computer accessible storage medium of the system 500, for example, a memory inside the controller 540 or an external memory (either inside or outside the FSE 420) being in data communication with the controller 540. In another implementation, the program can be stored in a separate storage medium. The storage medium may comprise any of a variety of technologies for storing information.

Figure 11:
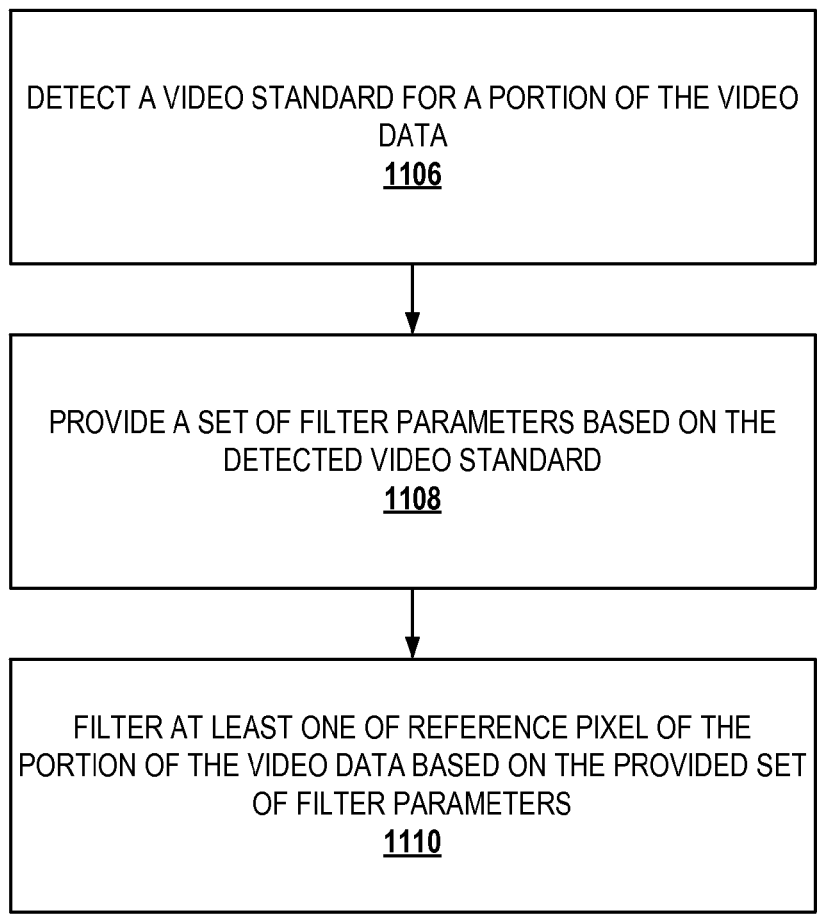
FIG. 11 shows a process flow diagram of a method for processing video data.

FIG. 11 shows a process flow diagram of a method of processing video data. The method may be implemented in one or more of the devices shown and described in FIG. 4. At node 1106, a video standard associated with a portion of the video data is detected. Each portion of the video data is associated with one of a plurality of video standards. At node 1108, a set of filter parameters for the portion of the video data is provided based on the detected video standard. At node 1110, at least one reference pixel of the portion of the video data is filtered, at least in part, on the provided set of filter parameters.

In some implementations, the reference pixels included in the video data are stored. In some implementations, a plurality of sets of filter parameters associated with a plurality of video standards, respectively, are stored. In some implementations, the reference pixels are stored using the same memory as the filter parameters. In some implementations, the reference pixels are stored using a different memory than the filter parameters.

Figure 12:
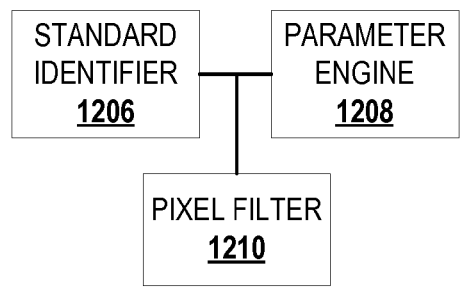
FIG. 12 shows a functional block diagram of a device for processing video data.

FIG. 12 shows a functional block diagram of a device for processing video data. Those skilled in the art will appreciate that a video processing device may have more components than the simplified device 1200 shown in FIG. 12. The device 1200 shown includes only those components useful for describing some prominent features of implementations within the scope of the claims. The device 1200 includes a standard identifier 1206, a parameter engine 1208, and a pixel filter 1210.

The standard identifier 1206 is configured to detect a video standard associated with a portion of the video data, each portion of the video data associated with one of a plurality of video standards. The standard identifier 1206 may include one or more of a comparator, a processor, an arithmetic unit, a data parser, and a signal processor. In some implementations, means for detecting a video standard may include the standard identifier 1206.

The parameter engine 1208 is configured to provide a set of filter parameters for the portion of the video data based on the detected video standard. The parameter engine 1208 may include one or more of a memory, a data bus, a clock, and a processor. Means for providing a set of filter parameters, in some implementations, may include the parameter engine 1208.

The pixel filter 1210 is configured to filter at least one reference pixel of the portion of the video data based, at least in part, on the provided set of filter parameters. The pixel filter 1210 may include one or more of a logic gate, an adder, a multiplier, a data buffer, a processor, and a memory. In some implementations, means for filtering at least one reference pixel includes the pixel filter 1210.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present invention.

The processes (including the controller 540) described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As used herein, the terms "determine" or "determining" encompass a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

While the above description has pointed out features of various implementations, the skilled person will understand that various omissions, substitutions, and changes in the form and details of the device or process illustrated may be made without departing from the scope of the appended claims.

What is claimed is:

1. A system for processing video data, the system comprising:
   a controller configured to:
      determine a video standard associated with a portion of the video data, each portion of the video data associated with one of a plurality of video standards, the plurality of video standards comprising at least one of VP6, VP8, and HEVC;
      provide a set of filter parameters for the portion of the video data based on the determined video standard;
   a plurality of filters configured to filter at least one reference pixel included in the portion of the video data based, at least in part, on the provided set of filter parameters, the plurality of filters comprising a first filter, a second filter, and a third filter; and a half pixel buffer, wherein the first filter is configured to filter the at least one reference pixel based on at least one of the provided filter parameters, the second filter is configured to filter the output of the first filter based on at least one of the provided filter parameters, the half pixel buffer is configured to buffer the output of the second filter, and the third filter is configured to filter the output of the half pixel buffer, wherein the filters are configurably pipelined according to the determined video standard, wherein, if the determined video standard is of a first type, filtering the at least one reference pixel comprises:
horizontally filtering, via the first filter, the at least one reference pixel; and
vertically filtering, via the second filter, the output of the first filter, wherein, if the determined video standard is of a second type, filtering the at least one reference pixel comprises:
vertically filtering, via the first filter, the at least one reference pixel; and
horizontally filtering, via the second filter, the output of the first filter, wherein, if the determined video standard is of a third type, filtering the at least one reference pixel comprises:
horizontally and vertically filtering, via the first filter, the at least one reference pixel;
vertically filtering, via the second filter, the output of the first filter; and
bilinear filtering, via the third filter, the output of the half pixel buffer, wherein processing the video data comprises at least one of encoding the video data and decoding the video data, and wherein the controller is configured to determine the video standard based, at least in part, on video standard identification information contained in a fractional search engine (FSE) software register.

2. The system of claim 1, further comprising a filter parameter engine configured to obtain the at least one set of the filter parameters, wherein the controller is configured to activate the filter parameter engine to provide the retrieved filter parameters to the at least one filter.

3. The system of claim 2, wherein the filter parameter engine includes a filter parameter memory storing a plurality of sets of filter parameters each associated with at least one of the plurality of video standards.

4. The system of claim 2, wherein the controller includes a filter parameter memory and the filter parameter engine, the filter parameter memory storing a plurality of sets of filter parameters each associated with at least one of the plurality of video standards.

5. The system of claim 2, further comprising:
a reference pixel memory storing the reference pixels; and
a reference pixel fetcher configured to:
fetch at least one reference pixel from the reference pixel memory; and
provide the fetched pixel to the at least one filter.

6. The system of claim 5, wherein the controller is configured to control the reference fetcher and the filter parameter engine such that the reference pixel fetching and filter parameter providing are substantially simultaneously performed.

7. The system of claim 1, wherein the video standard of the first type comprises one of VP6, VP8, HEVC, H.264 Chroma and MPEG4-SP.

8. The system of claim 1, wherein the video standard of the second type comprises VC1.

9. The system of claim 1, wherein the video standard comprises one of H.264 Luma and MPEG-ASP.

10. The system of claim 1, wherein at least one of the first filter and the second filter comprises:
a first half filter configured to filter a plurality of first reference pixels based on a first set of filter coefficients received from the filter parameter memory, wherein the number of the first reference pixels are the same as the number of the first filter coefficients; and
a second half filter configured to filter a plurality of second reference pixels based on a second set of filter coefficients received from the filter parameter memory, wherein the number of the second reference pixels are the same as the number of the second filter coefficients.

11. The system of claim 10, further comprising:
a first adder configured to add the outputs of the first and second half filters;
a second adder configured to:
obtain a plurality of rounding parameters from the filter parameter memory; and
sum the output of the first adder and the rounding parameters;
a shifter configured to:
obtain a plurality of shift parameters from the filter parameter memory; and
shift the output of the second adder based on the shift parameters; and
a clipper configured to clip the output of the shifter to a specified range.

12. The system of claim 10, wherein at least one of the first and second half filters comprises:
a logic gate configured to perform a logic operation on a first reference pixel based, at least in part, on a first filter coefficient;
a shift adder configured to perform a shift-adding function on a second reference pixel based, at least in part, on a second filter coefficient;
a first adder configured to add the outputs of the logic gate and the shift adder;
a first multiplier configured to multiply a third reference pixel and a third filter coefficient;
a second adder configured to add the outputs of the first adder and the first multiplier;
a second multiplier configured to multiply a fourth reference pixel and a fourth filter coefficient; and
a third adder configured to add the outputs of the second adder and the second multiplier.

13. The system of claim 1, further comprising a filter parameter memory storing a table including the plurality of sets of filter parameters assigned to each of the plurality of video standards, respectively.

14. The system of claim 13, wherein the filter parameter memory is configured to add thereon additional sets of filter parameters associated with additional video standards, respectively.

15. The system of claim 1, wherein the filter parameters comprise at least one of filter coefficients, rounding, and shift parameters.

16. The system of claim 15, wherein the filter parameters of a first video standard of the plurality of video standards are different from those of other video standards of the plurality of video standards.

17. A method of processing video data, the method comprising:
- detecting a video standard associated with a portion of the video data, each portion of the video data associated with one of a plurality of video standards, the plurality of video standards comprising at least one of VP6, VP8, and HEVC;
- providing a set of filter parameters for the portion of the video data based on the detected video standard; and
- filtering, using a plurality of filters, at least one reference pixel of the portion of the video data based, at least in part, on the provided set of filter parameters, the plurality of filters including a first filter, a second filter, and a third filter,
- wherein, if the detected video standard is of a first type, the filtering comprises horizontally filtering, via the first filter, the at least one reference pixel and subsequently vertically filtering, via the second filter, the first filtered pixel,
- wherein, if the detected video standard is of a second type, the filtering comprises vertically filtering, via the first filter, the at least one reference pixel and subsequently horizontally filtering, via the second filter, the first filtered pixel, and
- wherein, if the detected video standard is of a third type, the filtering comprises horizontally and vertically filtering, via the first filter, the at least one reference pixel, vertically filtering, via the second filter, the output of the first filter, buffering, via a half pixel buffer, the output of the second filter, and bilinear filtering, via the third filter, the output of the half pixel buffer,
- wherein processing the video data comprises at least one of encoding the video data and decoding the video data,
- wherein said detecting of the video standard is based, at least in part, on video standard identification information contained in a fractional search engine (FSE) software register.

18. The method of claim 17, wherein the video standard is determined based on video standard identification information.

19. The method of claim 17, further comprising fetching at least one reference pixel from the stored reference pixels, wherein the fetching and providing are substantially simultaneously performed.

20. The method of claim 17, wherein the video standard of the first type comprises one of VP6, VP8, HEVC, H.264 Chroma, and MPEG4-SP.

21. The method of claim 17, wherein the video standard of the second type comprises VC1.

22. The method of claim 17, wherein the video standard of the third type comprises one of H.264 Luma and MPEG-ASP.

23. The method of claim 17, further comprising:
- storing reference pixels included in the video data; and
- storing a plurality of sets of filter parameters associated with a plurality of video standards, respectively.

24. The method of claim 17, further comprising:
- receiving additional sets of filter parameters associated with additional video standards; and
- storing the received additional sets of filter parameters.

25. The method of claim 17, wherein the video standards comprise H.264, MPEG4-SP, MPEG4-ASP, VC1, VP6, VP8, and HEVC.

26. The method of claim 17, wherein the filter parameters comprise at least one of: filter coefficients, rounding and shift parameters, and wherein the filter parameters of one video standard of the plurality of video standards are different from those of other video standards of the plurality of video standards.

27. A non-transitory computer readable medium storing a processor-readable code, the processor-readable code for programming one or more processors to perform a method of processing video data, the method comprising:
- detecting a video standard associated with a portion of the video data, each portion of the video data associated with one of a plurality of video standards, the plurality of video standards comprising at least one of VP6, VP8, and HEVC;
- providing a set of filter parameters for the portion of the video data based on the detected video standard; and
- filtering, using a plurality of filters, at least one reference pixel of the portion of the video data based, at least in part, on the provided set of filter parameters, the plurality of filters including a first filter, a second filter, and a third filter,
- wherein, if the detected video standard is of a first type, the filtering comprises horizontally filtering, via the first filter, the at least one reference pixel and subsequently vertically filtering, via the second filter, the first filtered pixel,
- wherein, if the detected video standard is of a second type, the filtering comprises vertically filtering, via the first filter, the at least one reference pixel and subsequently horizontally filtering, via the second filter, the first filtered pixel,
- wherein, if the detected video standard is of a third type, the filtering comprises horizontally and vertically filtering, via the first filter, the at least one reference pixel, vertically filtering, via the second filter, the output of the first filter, buffering, via a half pixel buffer, the output of the second filter, and bilinear filtering, via the third filter, the output of the half pixel buffer,
- wherein processing the video data comprises at least one of encoding the video data and decoding the video data, and
- wherein said detecting of the video standard is based, at least in part, on video standard identification information contained in a fractional search engine (FSE) software register.

28. The medium of claim 27, wherein the video standard is determined based on video standard identification information.

29. The medium of claim 27, wherein the method further comprises:
- receiving additional sets of filter parameters associated with additional video standards; and
- storing the received additional sets of filter parameters.

30. The medium of claim 27, wherein the filter parameters comprise at least one of: filter coefficients, rounding and shift parameters, and wherein the filter parameters of one video standard of the plurality of video standards are different from those of other video standards of the plurality of video standards.

31. A system for processing video data, the system comprising:
- means for detecting a video standard associated with a portion of the video data, each portion of the video data associated with one of a plurality of video standards, the plurality of video standards comprising at least one of VP6, VP8, and HEVC;
- means for providing a set of filter parameters for the portion of the video data based on the detected video standard; and means for filtering at least one reference pixel of the portion of the video data based, at least in part, on the provided set of filter parameters, the means for filtering including a first filter, a second filter, and a third filter, wherein, if the detected video standard is of a first type, the filtering comprises horizontally filtering, via the first filter, the at least one reference pixel and subsequently vertically filtering, via the second filter, the first filtered pixel, wherein, if the detected video standard is of a second type, the filtering comprises vertically filtering, via the first filter, the at least one reference pixel and subsequently horizontally filtering, via the second filter, the first filtered pixel, wherein, if the detected video standard is of a third type, the filtering comprises horizontally and vertically filtering, via the first filter, the at least one reference pixel, vertically filtering, via the second filter, the output of the first filter, buffering, via a half pixel buffer, the output of the second filter, and bilinear filtering, via the third filter, the output of the half pixel buffer, wherein processing the video data comprises at least one of encoding the video data and decoding the video data, and wherein said means for detecting of the video standard detects the video standard based, at least in part, on video standard identification information contained in a fractional search engine (FSE) software register.

* * * * *